(12) United States Patent
Van Ness

(10) Patent No.: US 11,582,945 B1
(45) Date of Patent: Feb. 21, 2023

(54) CAT CARRIER WITH SLIDING TRAY AND CAT-RESISTANT LATCH

(71) Applicant: William Van Ness, Clifton, NJ (US)

(72) Inventor: William Van Ness, Clifton, NJ (US)

(*) Notice: Subject to any disclaimer, the term of this patent is extended or adjusted under 35 U.S.C. 154(b) by 114 days.

(21) Appl. No.: 17/060,314

(22) Filed: Oct. 1, 2020

(51) Int. Cl.
*A01K 1/02* (2006.01)
*A01K 1/00* (2006.01)

(52) U.S. Cl.
CPC .......... *A01K 1/0245* (2013.01); *A01K 1/0064* (2013.01)

(58) Field of Classification Search
CPC .. A01K 1/0245; A01K 1/0064; A01K 1/0107; A01K 1/03; A01K 1/033; A01K 1/0236
USPC .......................................................... 119/453
See application file for complete search history.

(56) References Cited

U.S. PATENT DOCUMENTS

| | | | | |
|---|---|---|---|---|
| 2,353,844 A * | 7/1944 | James | ................. | E05B 17/2003 292/346 |
| 3,490,417 A * | 1/1970 | Swinney | .............. | A01K 1/0245 206/508 |
| 3,710,761 A * | 1/1973 | Gregory | ............... | A01K 1/0245 220/4.24 |
| 4,140,080 A * | 2/1979 | Snader | ................. | A01K 1/0245 119/473 |
| 4,496,178 A * | 1/1985 | Best | ........................ | E05B 55/12 292/1.5 |
| 4,852,520 A * | 8/1989 | Goetz | .................. | A01K 1/0245 119/497 |
| 5,220,886 A * | 6/1993 | Hyde | ................... | A01K 1/0107 119/165 |
| 5,669,331 A * | 9/1997 | Richmond | ........... | A01K 1/0245 119/497 |
| 5,671,697 A * | 9/1997 | Rutman | ................. | A01K 15/02 119/472 |
| 5,791,292 A * | 8/1998 | Jempolsky | ........... | A01K 1/0245 119/482 |

(Continued)

FOREIGN PATENT DOCUMENTS

GB          2339666          9/2000

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Monica L Perry
(74) *Attorney, Agent, or Firm* — Thomas A. O'Rourke; Bodner & O'Rourke, LLP

(57) ABSTRACT

A cat carrier includes an enclosure, tray, grate, and latch. The enclosure has a front opening, and first and second holes. The tray is slidable within the enclosure, between extended and storage positions. The grate is joined to the tray, with a portion extending in proximity to the front opening of the enclosure when the tray is in the storage position. The latch has a handle, and first and second latch wires spring biased in opposite directions, with distal ends respectively received into the first and second holes, when in the storage position, to redundantly latch the tray the enclosure, so it cannot be undone by a cat housed in the carrier. The first and second latch wires each include finger graspable loops configured to be actuated by a thumb and forefinger, while pulling on the handle with the remaining fingers to single-handedly slide the tray out the enclosure.

14 Claims, 38 Drawing Sheets

(56) References Cited

U.S. PATENT DOCUMENTS

| | | | |
|---|---|---|---|
| D445,222 S * | 7/2001 | Ross | D30/108 |
| 6,338,318 B1 * | 1/2002 | Apichom | A01K 1/0107 |
| | | | 119/497 |
| D470,628 S * | 2/2003 | Kinder | D30/108 |
| 6,539,895 B2 * | 4/2003 | Hoagland | A01K 1/0245 |
| | | | 119/453 |
| 7,201,116 B2 * | 4/2007 | Axelrod | A01K 1/0245 |
| | | | 119/499 |
| D615,251 S * | 5/2010 | Scherbing | D30/109 |
| D703,876 S * | 4/2014 | Chance | D30/108 |
| 8,733,293 B2 | 5/2014 | Link | |
| 8,925,491 B2 * | 1/2015 | Glover | A01K 1/0245 |
| | | | 119/497 |
| 9,247,710 B2 | 2/2016 | Glover | |
| 9,370,165 B2 * | 6/2016 | De Bien | A01K 1/034 |
| 9,504,230 B1 * | 11/2016 | Schillero, Jr. | A01K 1/0236 |
| 2007/0000447 A1 * | 1/2007 | Jakubowski | A01K 1/034 |
| | | | 119/453 |
| 2008/0022938 A1 * | 1/2008 | Callan | A01K 1/011 |
| | | | 119/165 |
| 2014/0150728 A1 * | 6/2014 | Tamiozzo | A01K 31/02 |
| | | | 119/501 |
| 2014/0318469 A1 * | 10/2014 | Beasley | A01K 1/0245 |
| | | | 119/497 |
| 2016/0066535 A1 | 3/2016 | Anderson | |
| 2017/0292299 A1 * | 10/2017 | Cantwell | A01K 1/032 |
| 2019/0021272 A1 * | 1/2019 | Marshall, III | A01K 1/033 |
| 2019/0191664 A1 * | 6/2019 | Xin | A01K 1/03 |

OTHER PUBLICATIONS

"Three General Types of Fit," available at www.mmto.org/dclark/Reports/Encoder%20Upgrade/fittolerences%20%5BRead-Only%5D.pdf., Jul. 8, 2019.

"Engineering Fit," available at: https://en.wikipedia.org/wiki/Engineering_fit, Jul. 8, 2019.

* cited by examiner

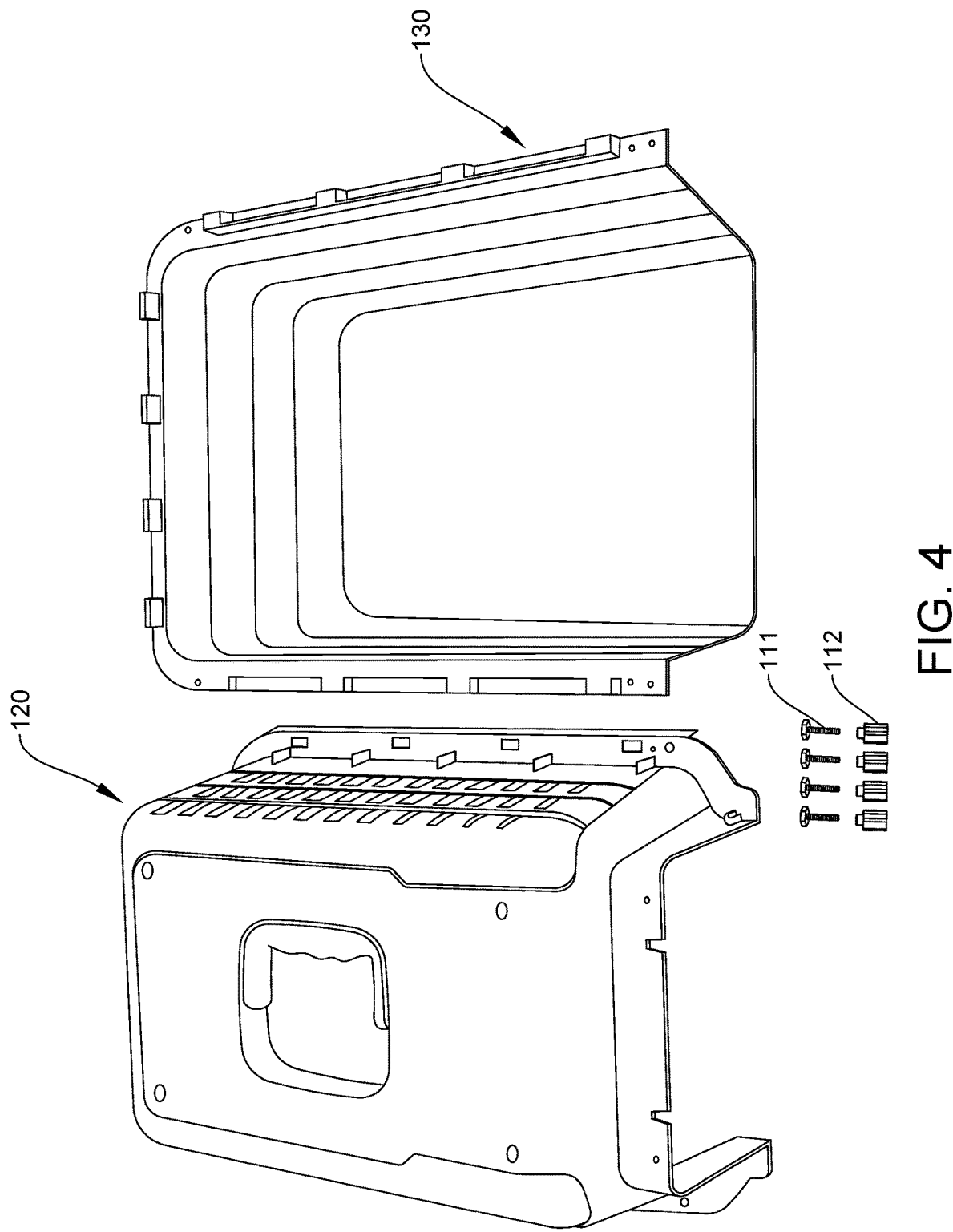

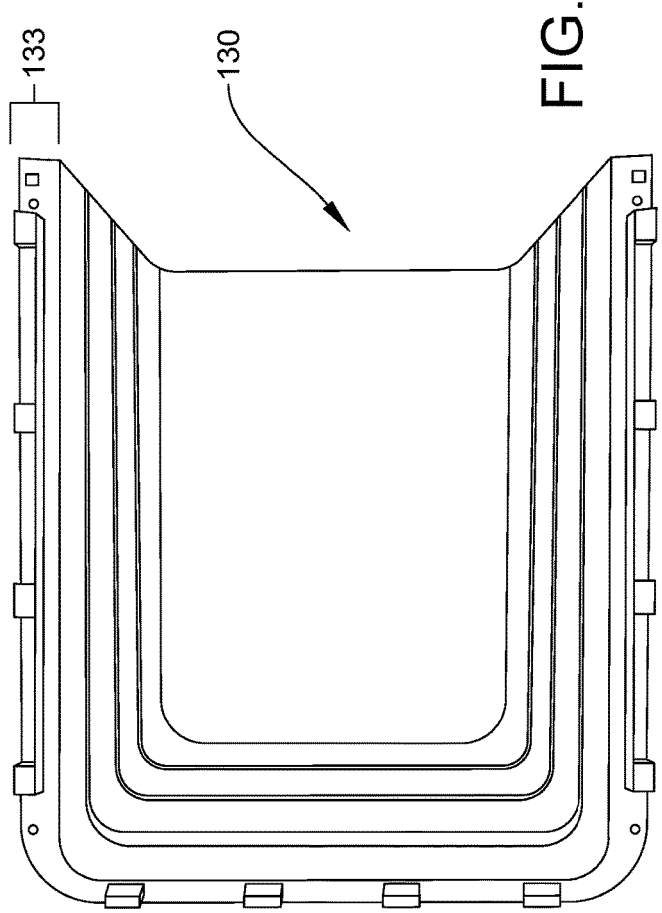
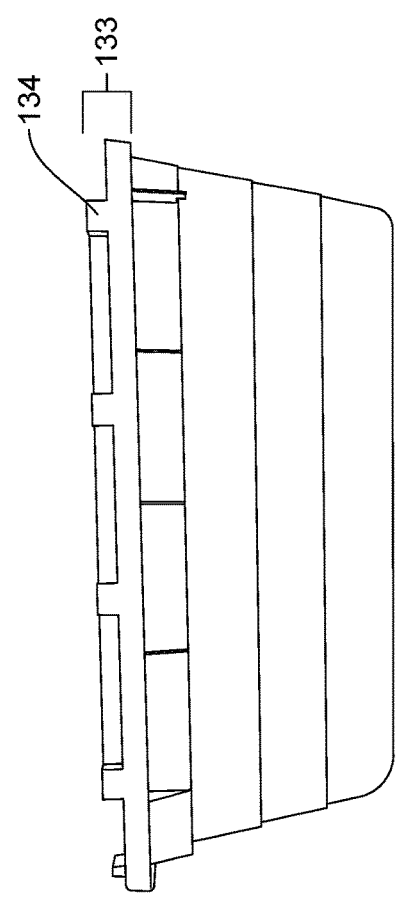
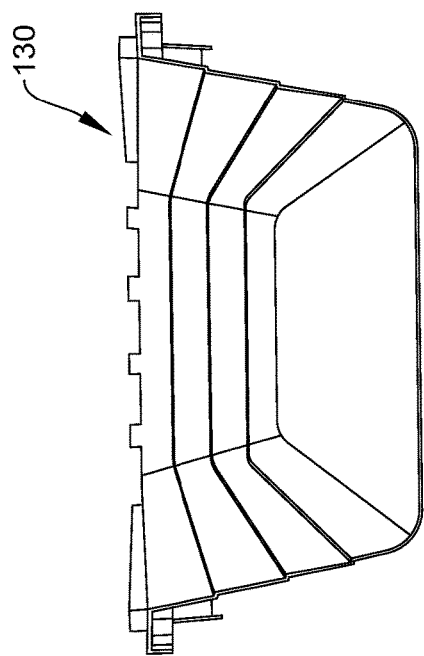
FIG. 6
FIG. 7
FIG. 5

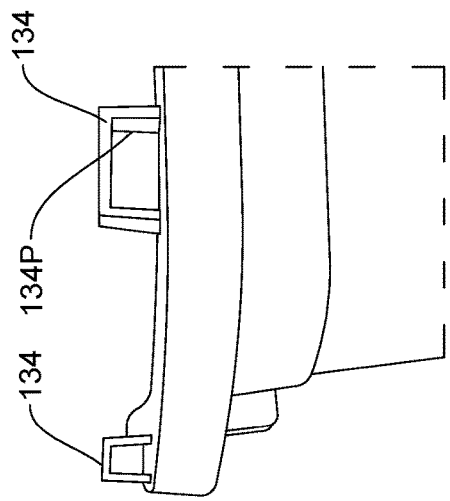
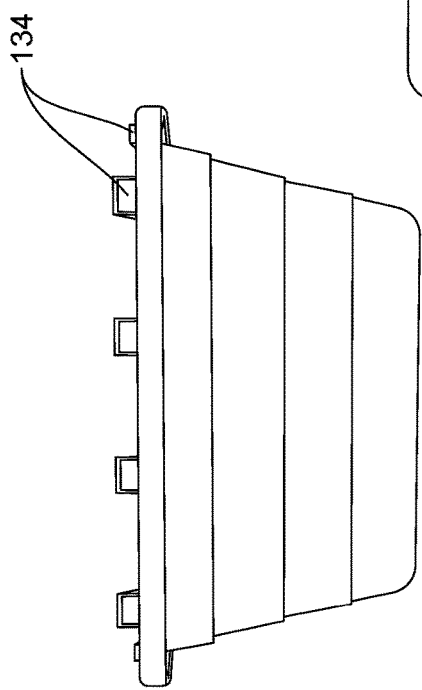
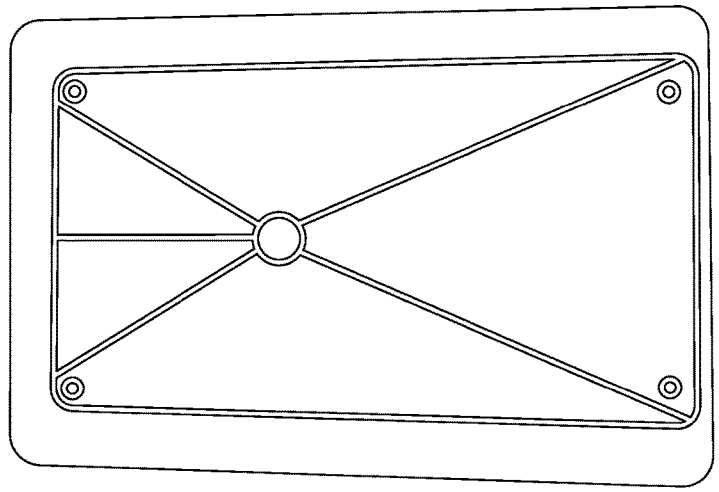

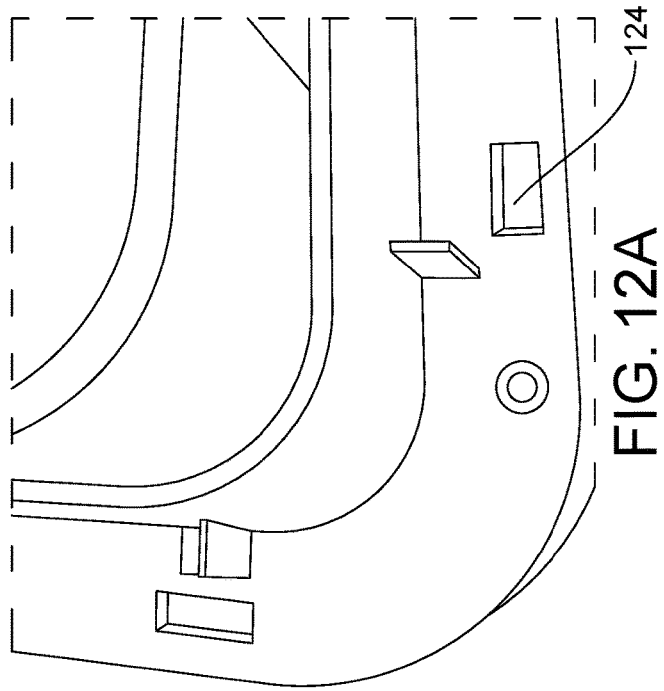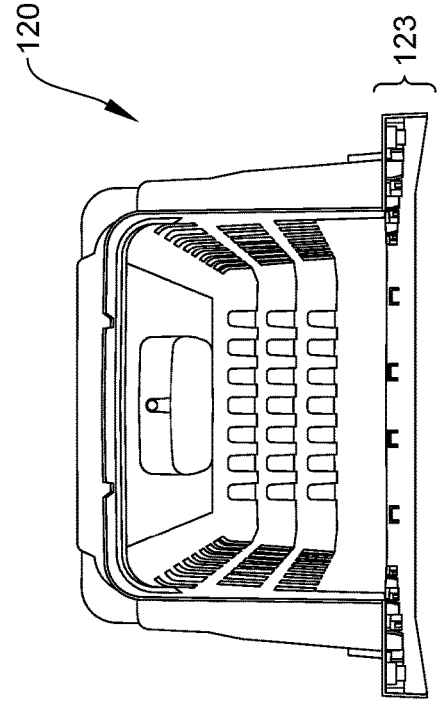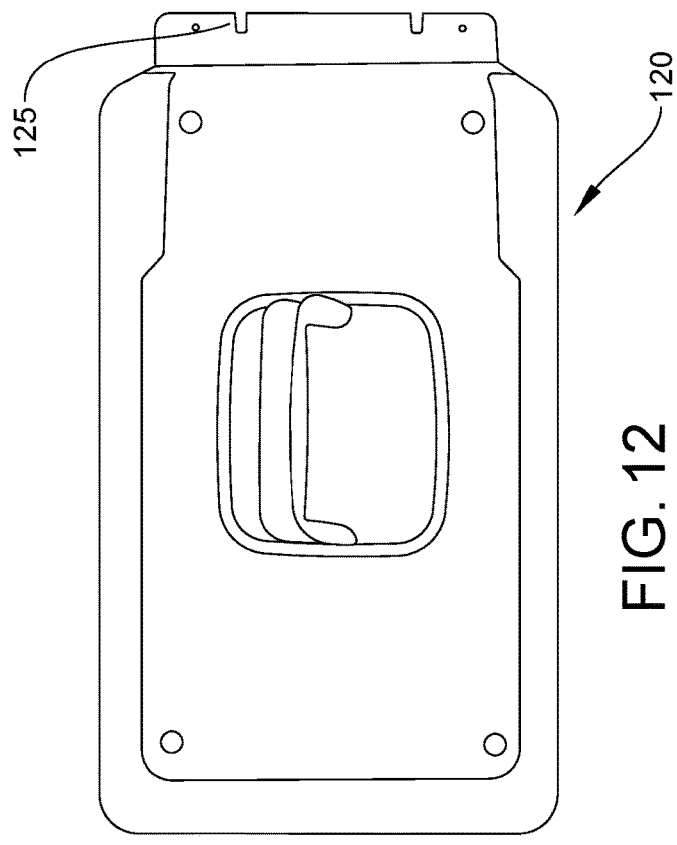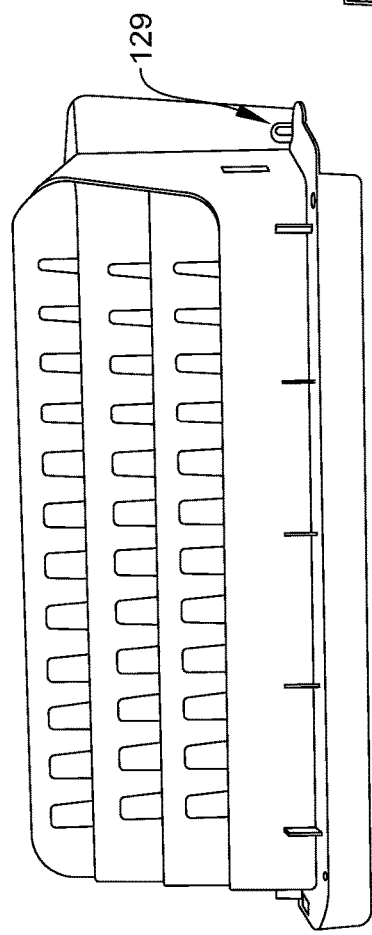

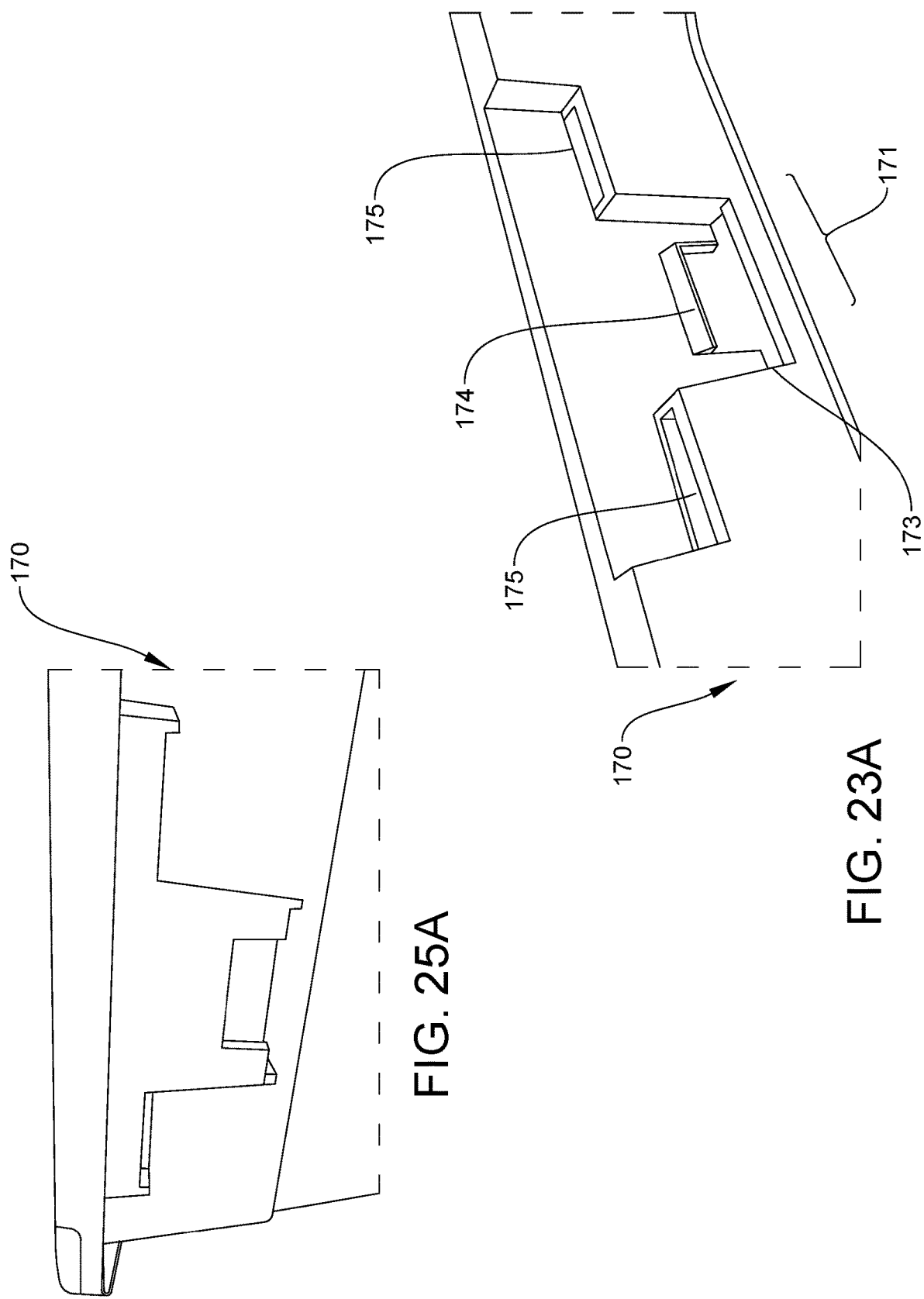

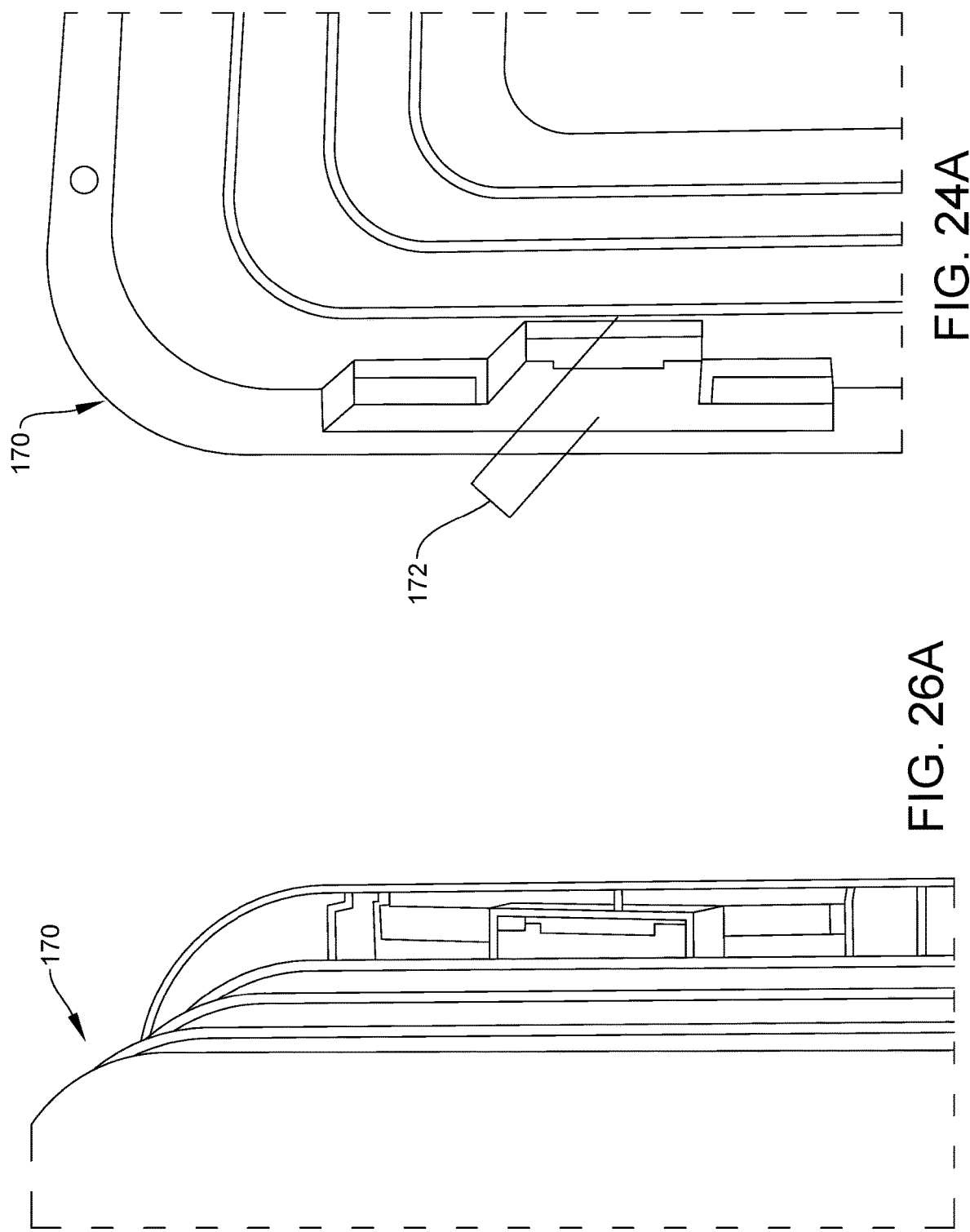

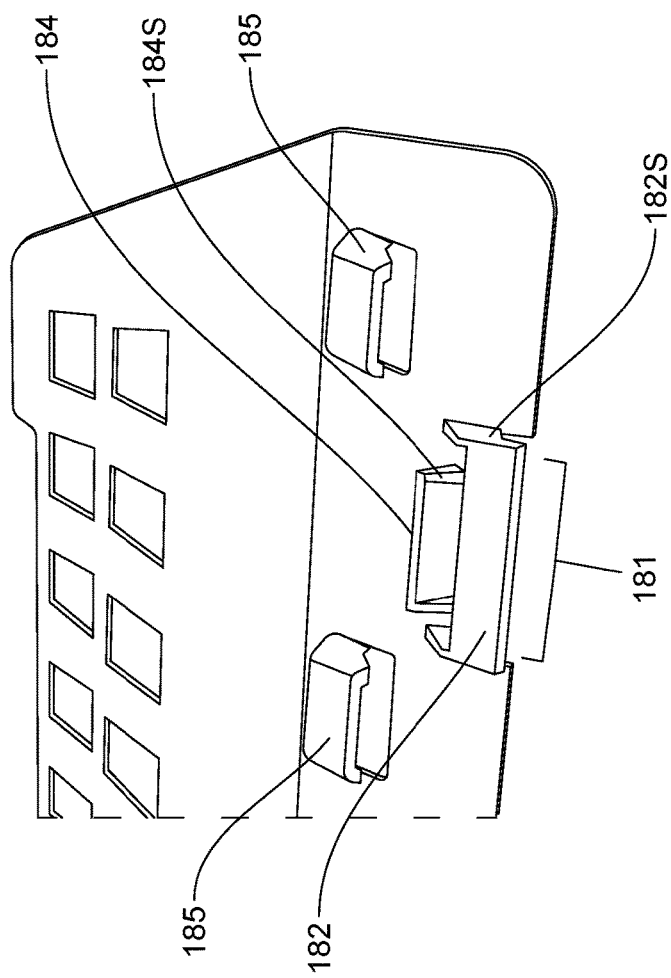
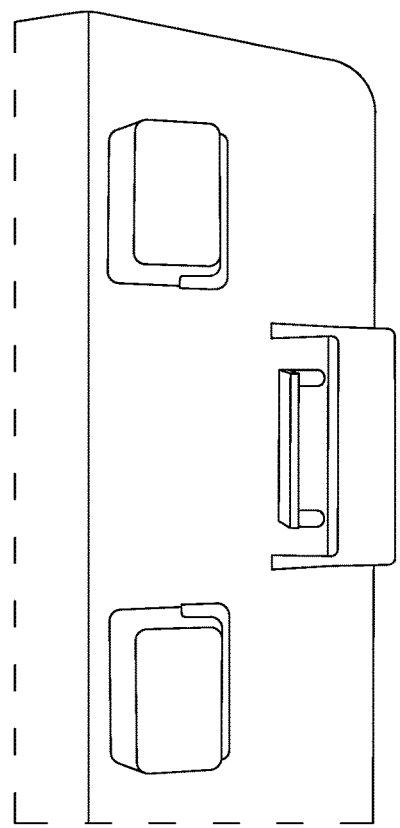
FIG. 27A
FIG. 27B

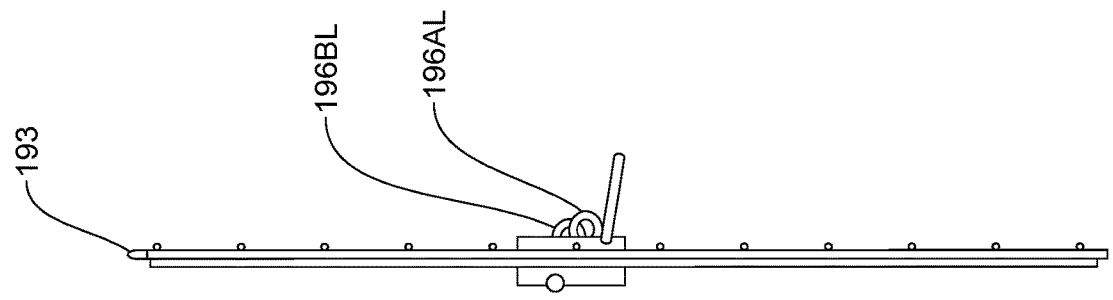
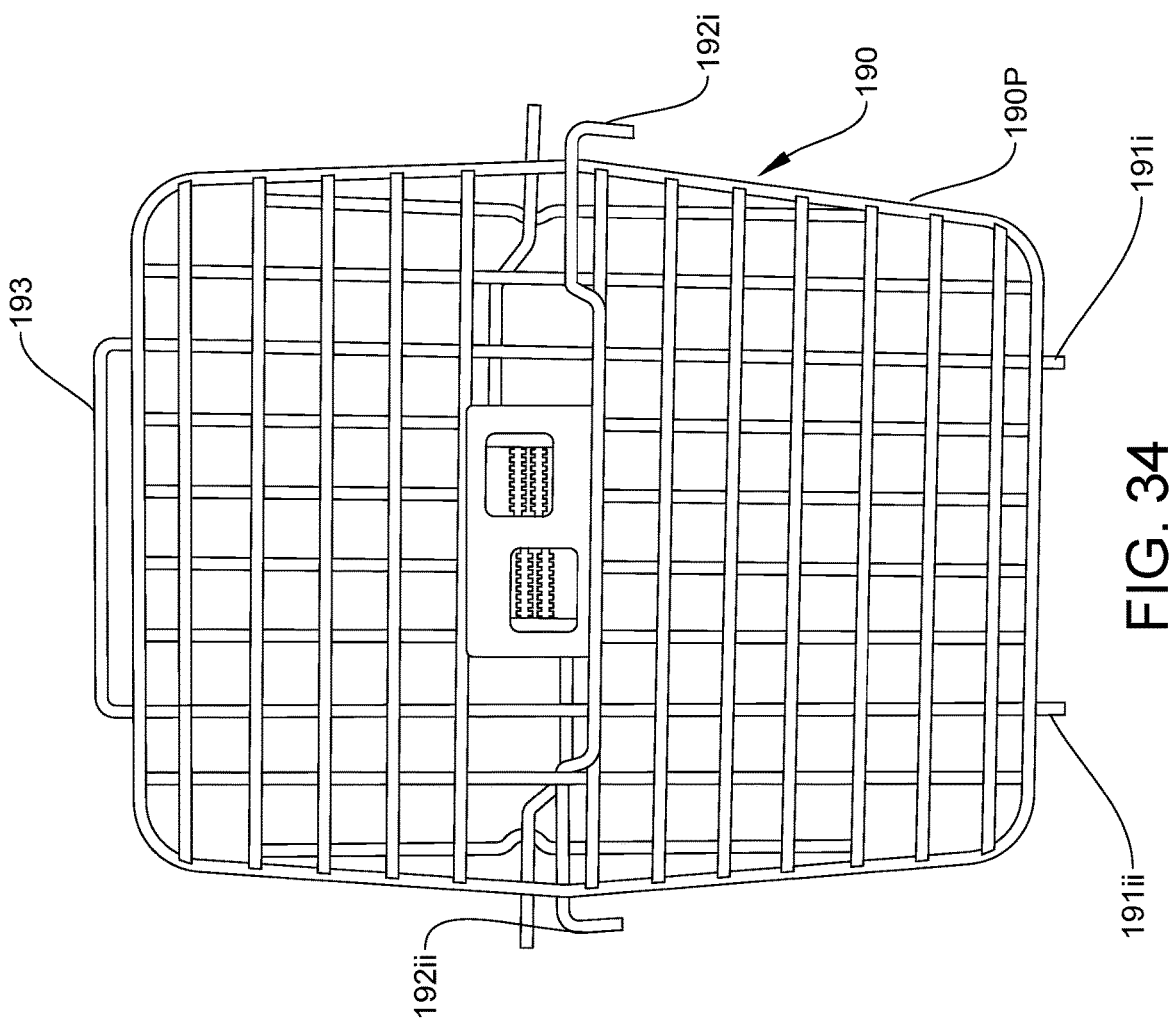

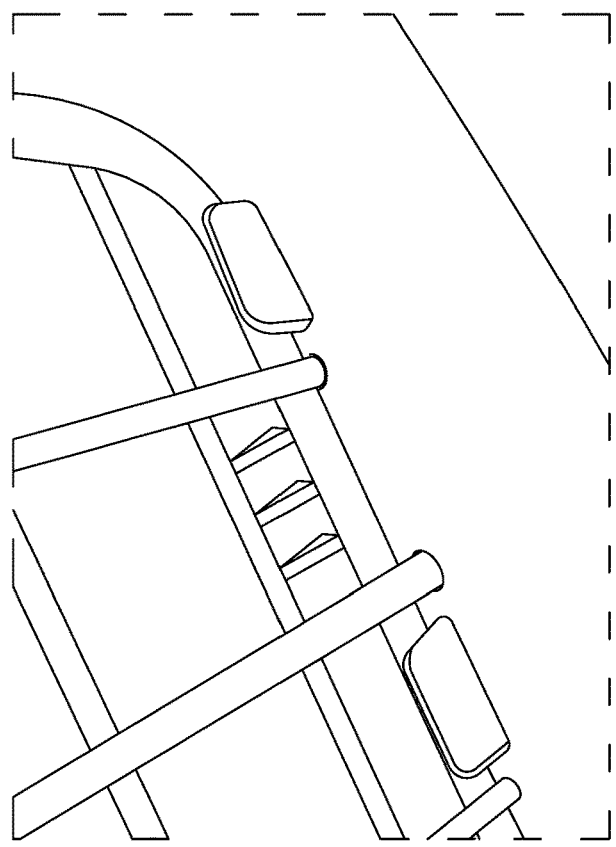
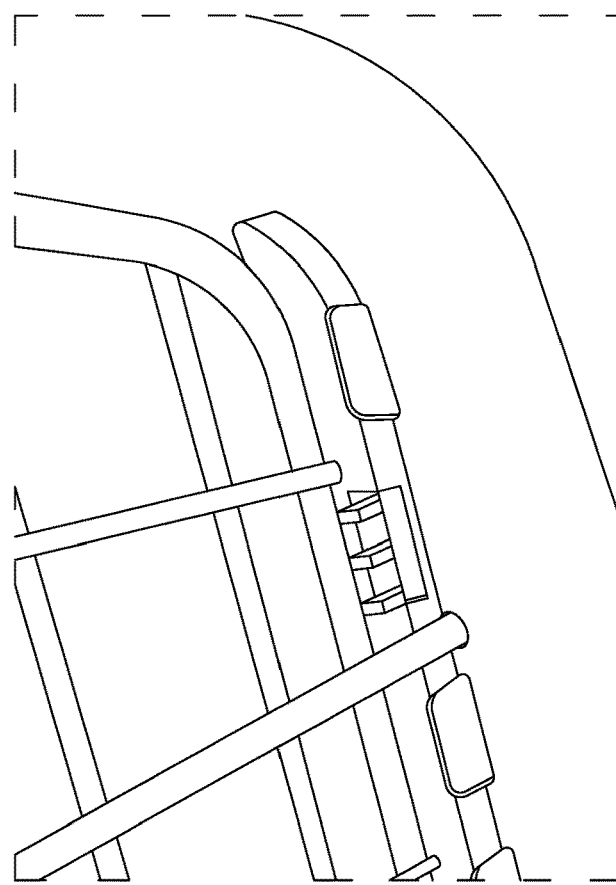
FIG. 38B
FIG. 38A

A CAT CARRIER WITH SLIDING TRAY AND CAT-RESISTANT LATCH

FIELD OF THE INVENTION

The present invention relates to improvements in pet carriers, and more particularly to a cat carrier with a sliding cat tray that has an easily operable door latch arrangement which nonetheless cannot be operated by a cat.

BACKGROUND OF THE INVENTION

A portable pet carrier has been known to, and used by, pet owners for many years, as shown, for example, by the "Animal Shipping Crate" of U.S. Pat. No. 3,710,761 to Gregory, and the "Combination Shipping and Living Compartment for Animals" taught by U.S. Pat. No. 3,390,417 to Swinney.

Advancements have been made to such carriers, particularly for transporting cats, as shown for example by U.S. Pat. No. 8,925,491 to Glover, which is for a "Cat Carrier with Destabilizing Floor." The Glover cat carrier includes an outer housing formed of an upper shell and a lower shell, which housing slidably receives an insert, into which the cat may be placed. The insert includes a rear barrier wall that extends up toward the upper interior of the upper shell to prevent the cat from hopping backwards and being a trapped in an area behind the insert, when it is being pulled out by the pet owner. The front of the insert includes a front panel with a handle that may be rotated to unlatch the insert from the housing, and permit the insert to be slid outwardly.

The Glover cat carrier has some problems for the pet owner. First, cats are very smart and very capable, and are known to rotate door knobs to unlatch and open doors that would otherwise keep them in a confined space. Videos available online document such abilities of cats. In addition, manufacturing of the Glover carrier includes a number of inefficient assemblies and assembly sequences.

The apparatus disclosed herein improves upon these problems and other aspects of the Glover cat carrier.

It is noted that citing any reference within this disclosure, i.e., any patents, published patent applications, and non-patent literature, is not an admission regarding any determination as to its availability as prior art with respect to the herein disclosed and claimed apparatus.

OBJECTS OF THE INVENTION

It is an object of the invention to provide a portable cat carrier.

It is another object of the invention to provide a cat carrier with a slidable insert.

It is a further object of the invention to provide a cat carrier that includes a slidable insert with a front grate that can be latched to the outer housing of the carrier.

It is another object of the invention to provide a cat carrier with a slidable insert that may be latched to the outer housing in an easy to open manner by a pet owner, being a latch that a cat is not capable of actuating.

It is also an object of the invention to provide a latch for a slidable insert of a cat carrier, where the latch may be easily actuated and the insert slid outwardly using one hand in a single motion.

Further objects and advantages of the invention will become apparent from the following description and claims, and from the accompanying drawings.

BRIEF DESCRIPTION OF THE DRAWINGS

FIG. 4 is an exploded view of the component parts used to make the housing of FIG. 2, including a lower housing portion, an upper housing portion, and fasteners for joining the upper and lower housing portions together without the use of tools.

FIG. 5 is a side view of the lower housing portion of FIG. 4.

FIG. 6 is a front view of the lower housing portion of FIG. 5.

FIG. 6A is an enlarged detail view of one side of the lower housing portion shown in FIG. 6

FIG. 7 is a top view of the lower housing portion of FIG. 5.

FIG. 8 is a rear view of the lower housing portion of FIG. 5.

FIG. 8A is an enlarged detail view of one corner of the lower housing portion shown in FIG. 8, showing openings formed in the upper surface usable for mating with the upper housing portion.

FIG. 9 is a bottom view of the lower housing portion of FIG. 5.

FIG. 10 is a side view of the upper housing portion of FIG. 4.

FIG. 11 is a front view of the upper housing portion of FIG. 10.

FIG. 12 is a top view of the upper housing portion of FIG. 10.

FIG. 12A is an enlarged detail view of one corner of the upper housing portion shown in FIG. 12.

FIG. 23A is an enlarged detail view of a first corner of the base of the insert assembly shown in FIG. 24.

FIG. 24A is an enlarged detail view of the first corner of the base of the insert assembly shown in FIG. 24.

FIG. 25A is an enlarged detail view of the first corner of the base of the insert assembly, as shown in FIG. 25.

FIG. 26A is an enlarged detail view of the first corner of the base of the insert assembly, as shown in FIG. 26.

FIG. 27A is a first corner of the front of the rear barrier panel of FIG. 27 shown enlarged.

FIG. 27B is a perspective view of the first corner of the front of the rear barrier panel of FIG. 27 shown enlarged.

FIG. 34 is a front view of the grate and latch assembly of the insert assembly of FIG. 3.

FIG. 35 is a side view of the grate and latch assembly of FIG. 34.

FIG. 38A shows the grate aligned with the front of the base of the insert assembly, with one protruding wire of the grate inserted through the corresponding hole of the base, but shown just prior to inserting of a portion of the peripheral wire of the grate into engagement with the locking protrusions of the base.

FIG. 38B is the view of FIG. 38A, but shown after inserting of the portion of the peripheral wire of the grate into engagement with the locking protrusions of the base.

DETAILED DESCRIPTION OF THE INVENTION

Figure 1:
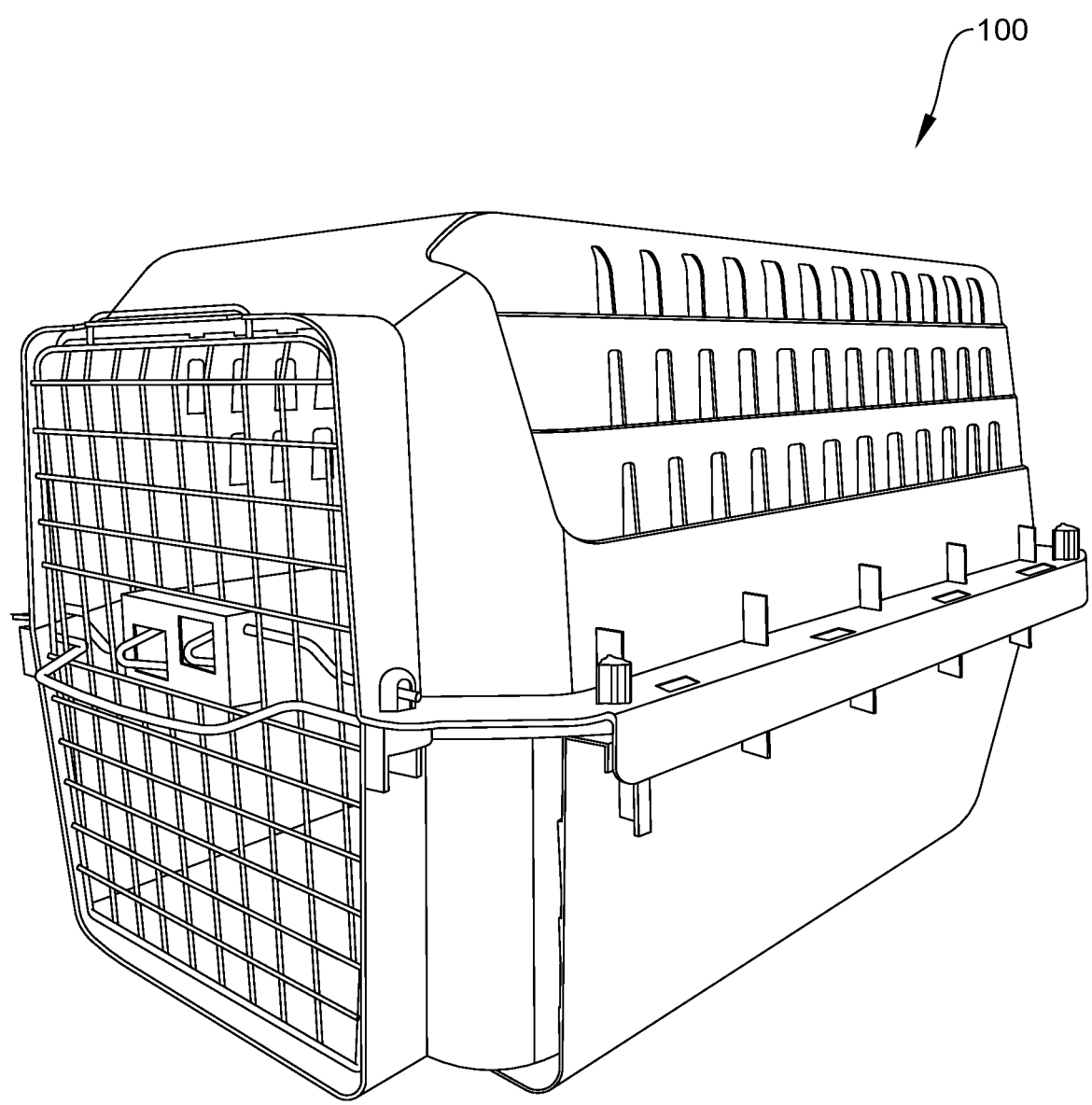
FIG. 1 is a perspective view of one embodiment of the improved cat carrier disclosed herein.

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed and/or claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of .0001 inches to .0003 inches, or an interference of .0003 inches to .0007 inches in another embodiment, or an interference of .0007 inches to .0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be .1360 inches for a free running fit; for a 0.5000 inch diameter shaft the opening may be 0.5156 inches for a close running fit and may be .5312 inches for a free running fit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder%20Upgrade/fittolerences%20%5BRead-Only%5D.pdf.

Figure 3:
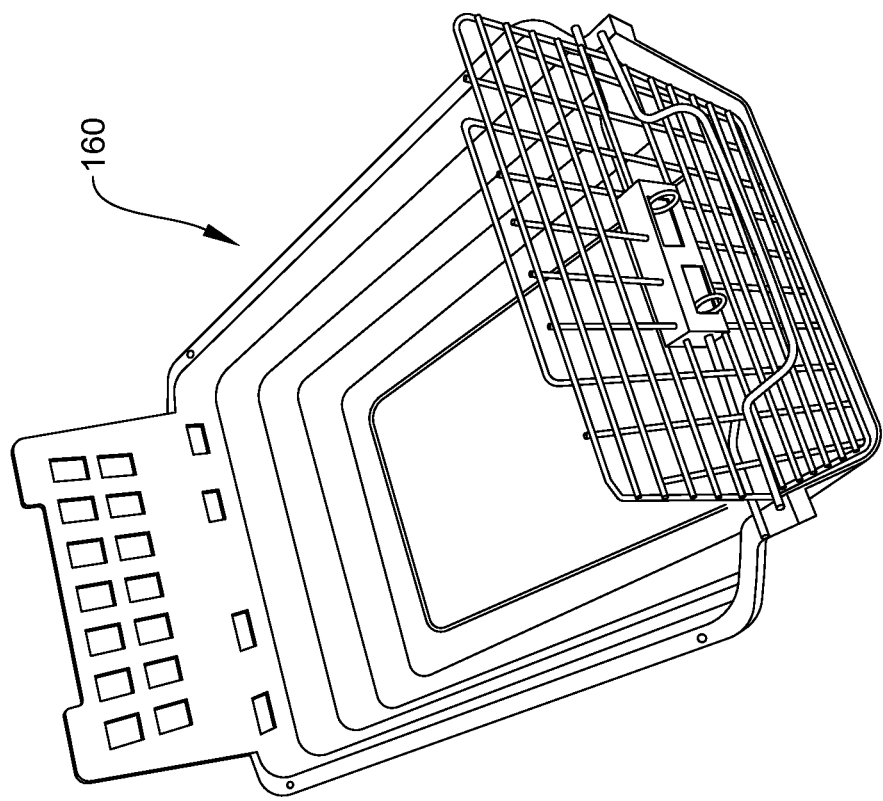
FIG. 3 is a perspective view of the slidable insert assembly of the cat carrier of FIG. 1.
Figure 2:
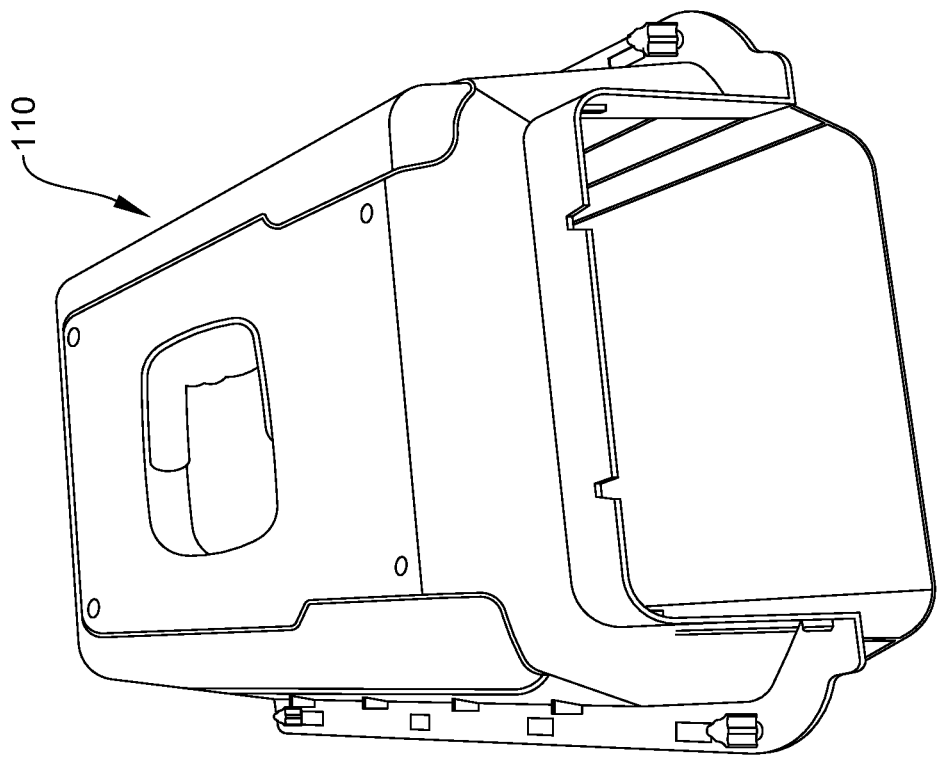
FIG. 2 is a perspective view of the housing of the cat carrier of FIG. 1.
Figure 7A:
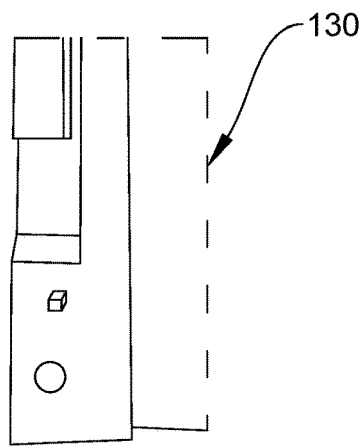
FIG. 7A is an enlarged detail view of one corner of the lower housing portion shown in FIG. 7.
Figure 7A:
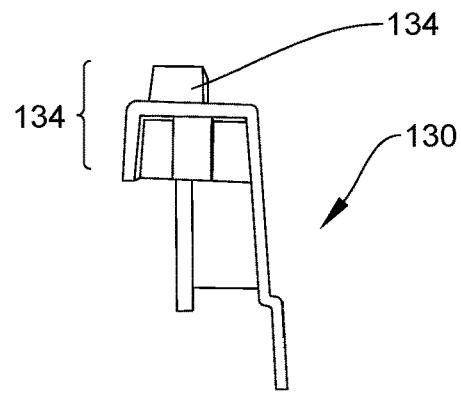
Figure 9A:
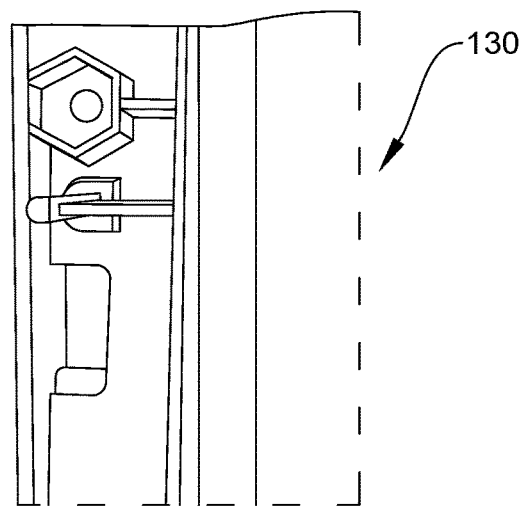
FIG. 9A is an enlarged detail view of one corner of the lower housing portion shown in FIG. 9.
Figure 14A:
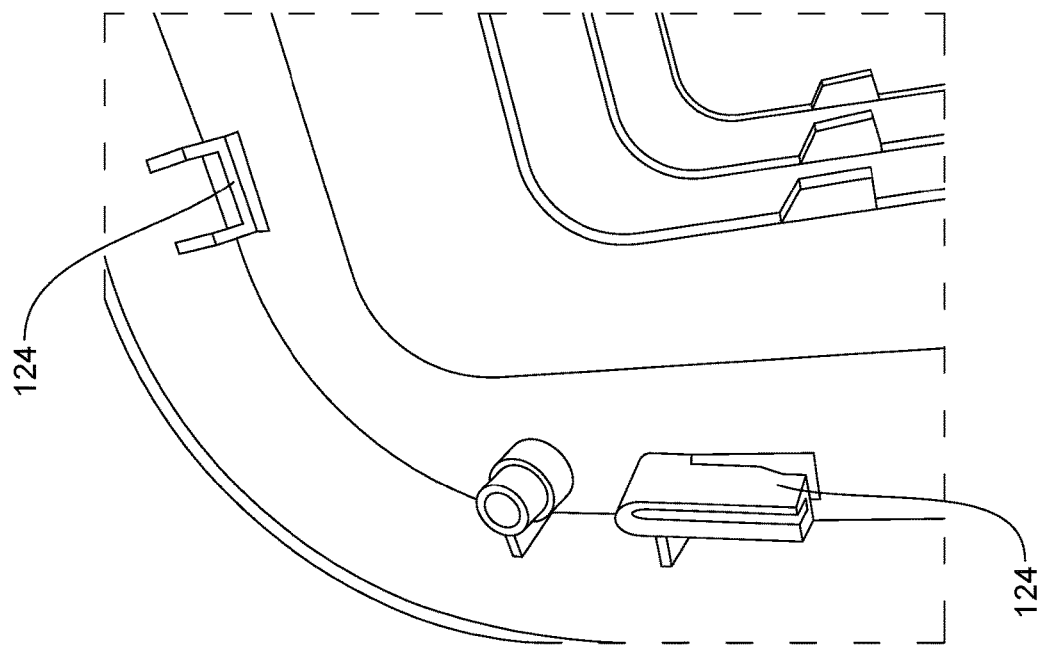
FIG. 14A is an enlarged perspective view of one corner of the upper housing shown in FIG. 14, showing hooks therein that are positioned to mate with the openings in the upper side of the lower housing portion.
Figure 13:
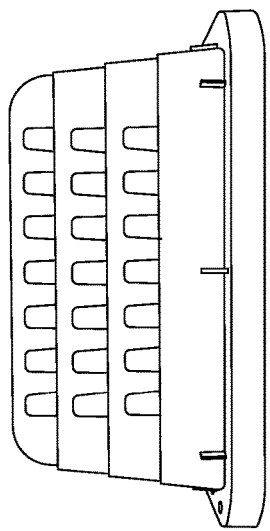
FIG. 13 is a rear view of the upper housing portion of FIG. 10.
Figure 14:
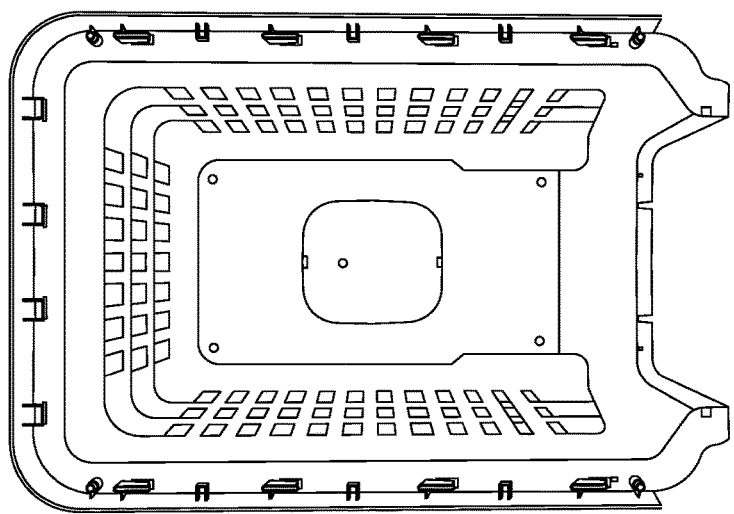
FIG. 14 is a bottom view of the upper housing portion of FIG. 10.

FIG. 1 is a perspective view of an improved cat carrier 100, which may be formed to include a housing assembly 110, shown in FIG. 2, and a slidable insert assembly 160, shown in FIG. 3.

As seen in the exploded view of FIG. 4, the housing assembly 110 may include a lower housing portion 120, an upper housing portion 130, and fasteners (e.g., a plurality of bolts 111 and low profile width wing nuts 112) that in combination with features of the housing portions may join the upper and lower housing portions together without the use of tools.

The lower housing portion 130 is shown in detail in FIGS. 5-9A. The lower housing portion 130 may have a four-sided rectangular box shape, being open on a first side (see FIG. 6) to subsequently accommodate receiving a portion of the insert assembly 160 therethrough (when joined to the upper housing 120), and having a mating flange 133 surrounding a portion of a second open side (see FIG. 7) for mating with the upper housing portion 120. As seen in FIGS. 6A, 7A, 8A, and 9A, the mating flange 133 may include a plurality of protrusions 134 protruding away from the box shape, each having openings 134P formed therein on the same side to slidably receive corresponding hooks of the upper housing portion 120, to permit the upper housing portion 120 to be slidably engaged with the lower housing portion 130.

The upper housing portion 120 is shown in detail in FIGS. 10-14A, and may similarly be formed to have a four-sided rectangular box shape, being open on a first side (see FIG. 11) to subsequently accommodate receiving a portion of the insert assembly 160 therethrough (when joined to the lower housing 130), and having a mating flange 123 surrounding a portion of a second open side (see FIG. 7) for mating with the lower housing portion 130. As seen at least in FIGS. 11, 12A, 14, and 14A, the mating flange 123 may include a plurality of protruding hooks 124 protruding away from the box shape, each formed to protrude in the same direction to be slidably inserted into the corresponding openings 134P of the protrusions 134 of the upper housing portion 120, when the upper housing portion 120 is slidably engaged with the lower housing portion 130. As seen in FIG. 12 and FIG. 44A, the upper housing portion 120 may also have a pair of notches 125 positioned in its front upper surface. Also, as seen in FIG. 12A, the upper housing portion 120 may have a handle pivotally coupled thereto.

Figure 15:
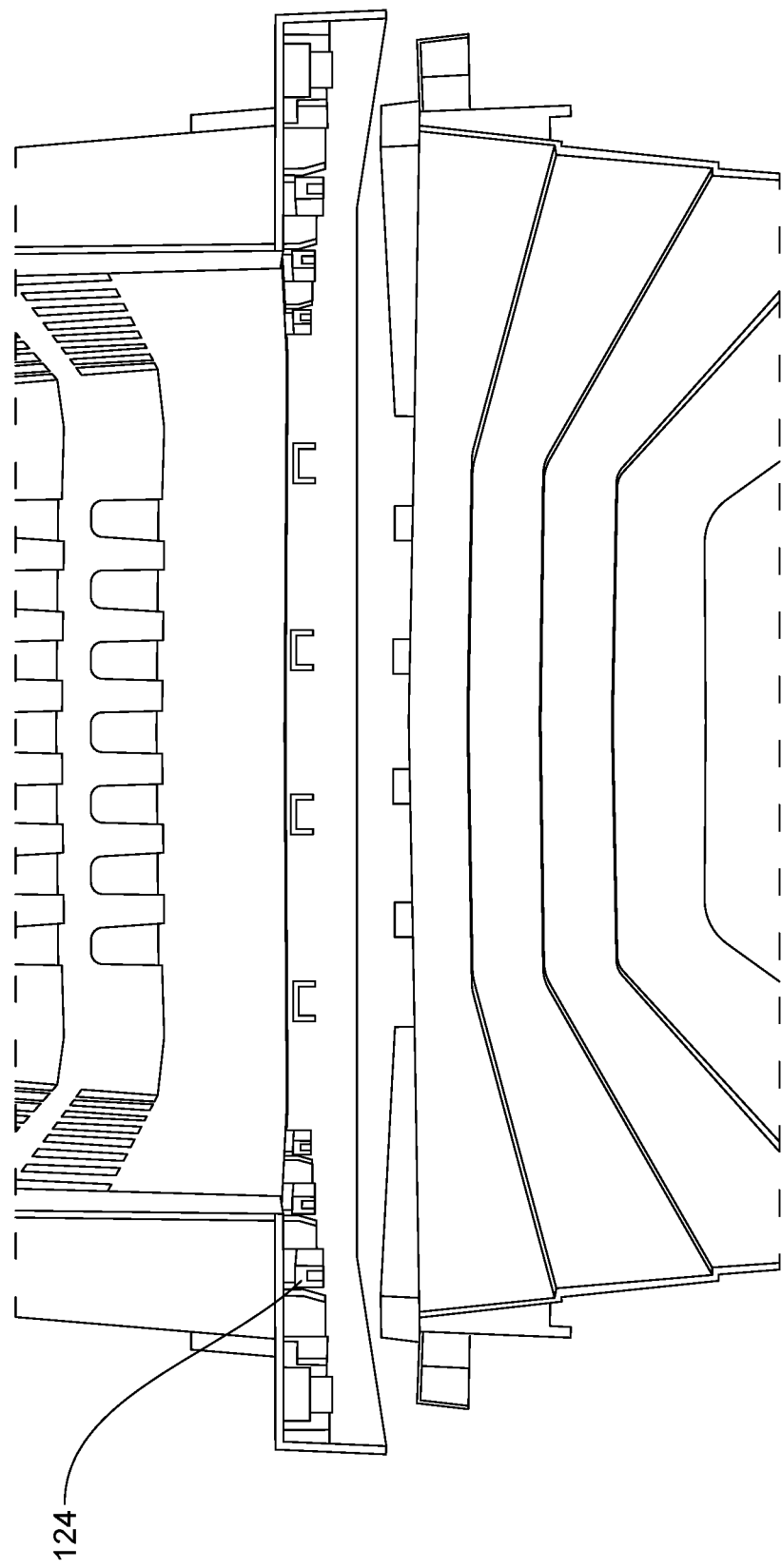
FIG. 15 is a front view showing the upper housing portion after being positioned adjacent to the lower housing portion, but prior to engagement of the hooks of the upper housing portion within the openings of the lower housing portion.

FIG. 15 shows the upper housing portion 120 after being positioned adjacent to the lower housing portion 130, but prior to the beginning of engagement of the hooks 124 of the upper housing portion within the openings 134P in the protrusions 134 of the upper housing portion 120.

Figure 17:
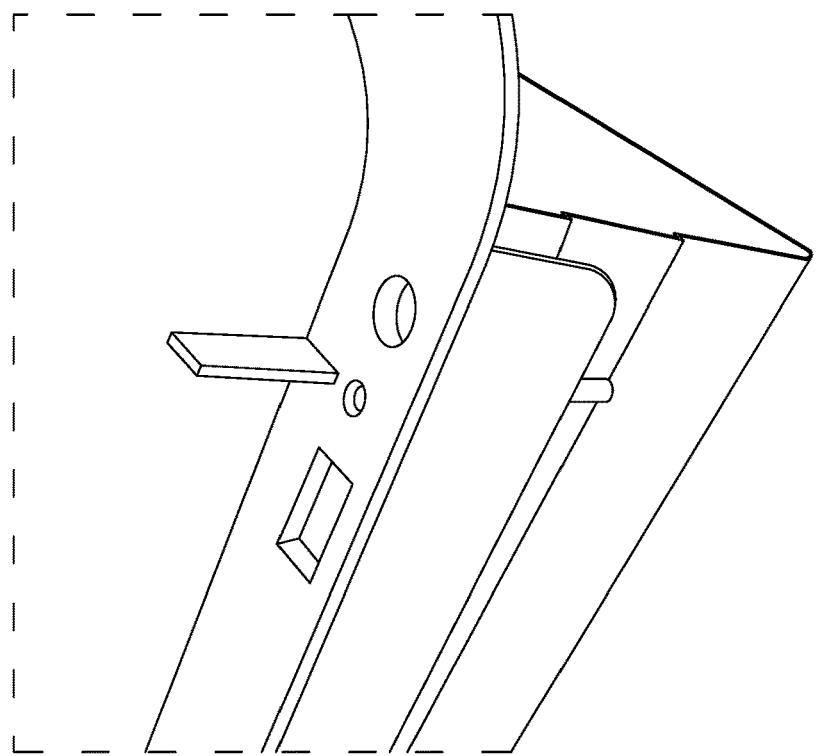
FIG. 17 is the perspective view of FIG. 16, but shown after the upper housing portion and lower housing portion have been slid relative to each other to cause engagement of the hooks of the upper housing portion within the openings of the lower housing portion.
Figure 16:
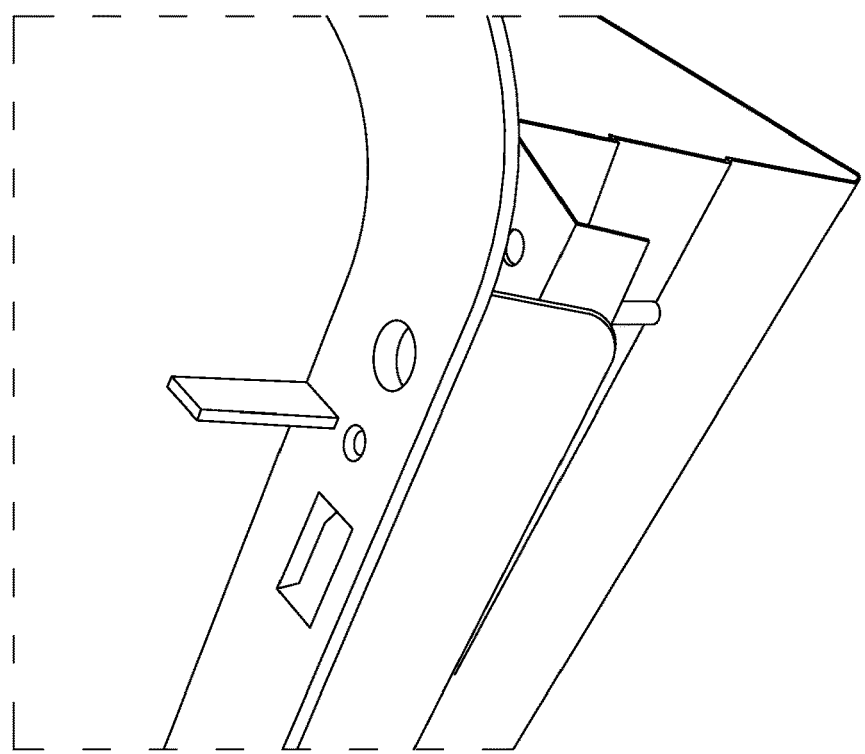
FIG. 16 is top perspective view of the front of the upper housing portion and lower housing portion as shown in FIG. 15.
Figure 18:
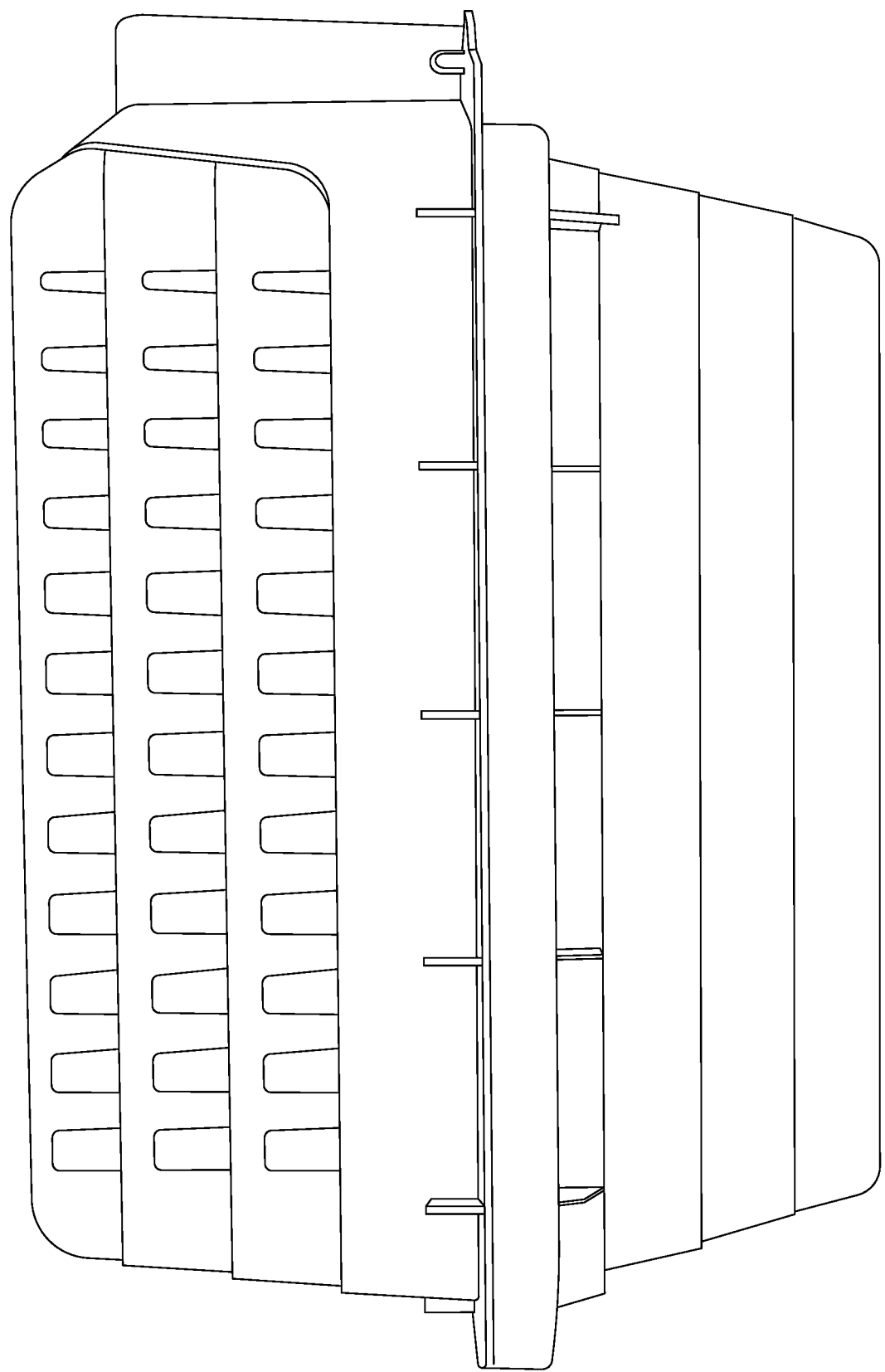
FIG. 18 is a side view of the upper housing portion and lower housing portion engaged with respect to each other, as shown in FIG. 17.

FIG. 16 is top perspective view of the front of the upper housing portion 120 and lower housing portion 130, shown where the hooks 124 of the upper housing portion are beginning to be inserted within the openings 134P in the protrusions 134 of the lower housing portion; and FIG. 17 is the perspective view of FIG. 16, but shown after the upper housing portion 120 and lower housing portion 130 have been slid relative to each other to cause engagement of the hooks of the upper housing portion within the openings of the lower housing portion. FIG. 18 shows a side view of the engaged arrangement of the upper housing portion 120 and lower housing portion 130.

Figure 19:
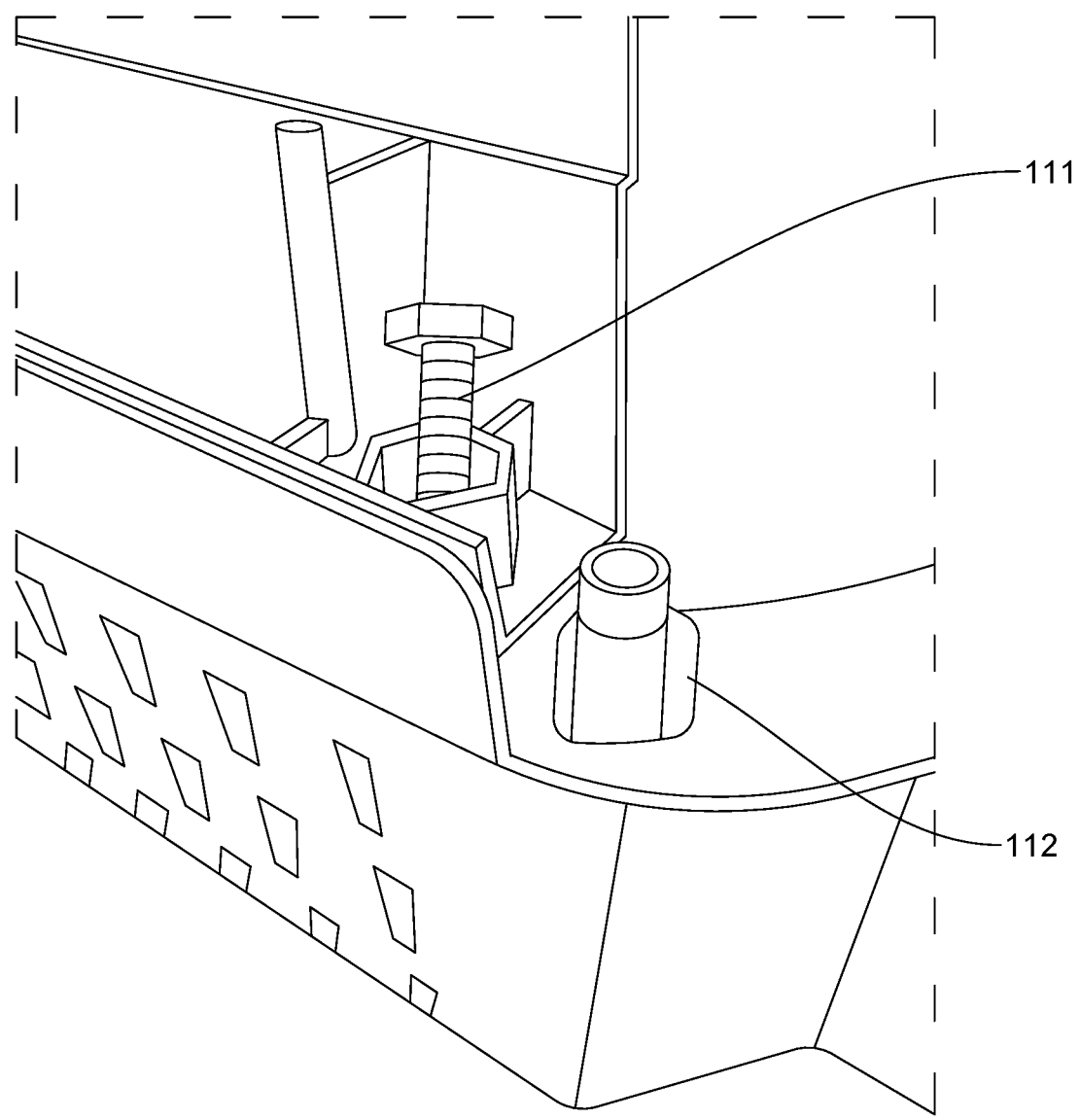
FIG. 19 is a bottom perspective view of the front of the upper housing portion and lower housing portion engaged with respect to each other, as shown in FIG. 18, and shown with a bolt being inserted into an aligned set of holes to fasten the housing portions together using a wing nut.
Figure 20:
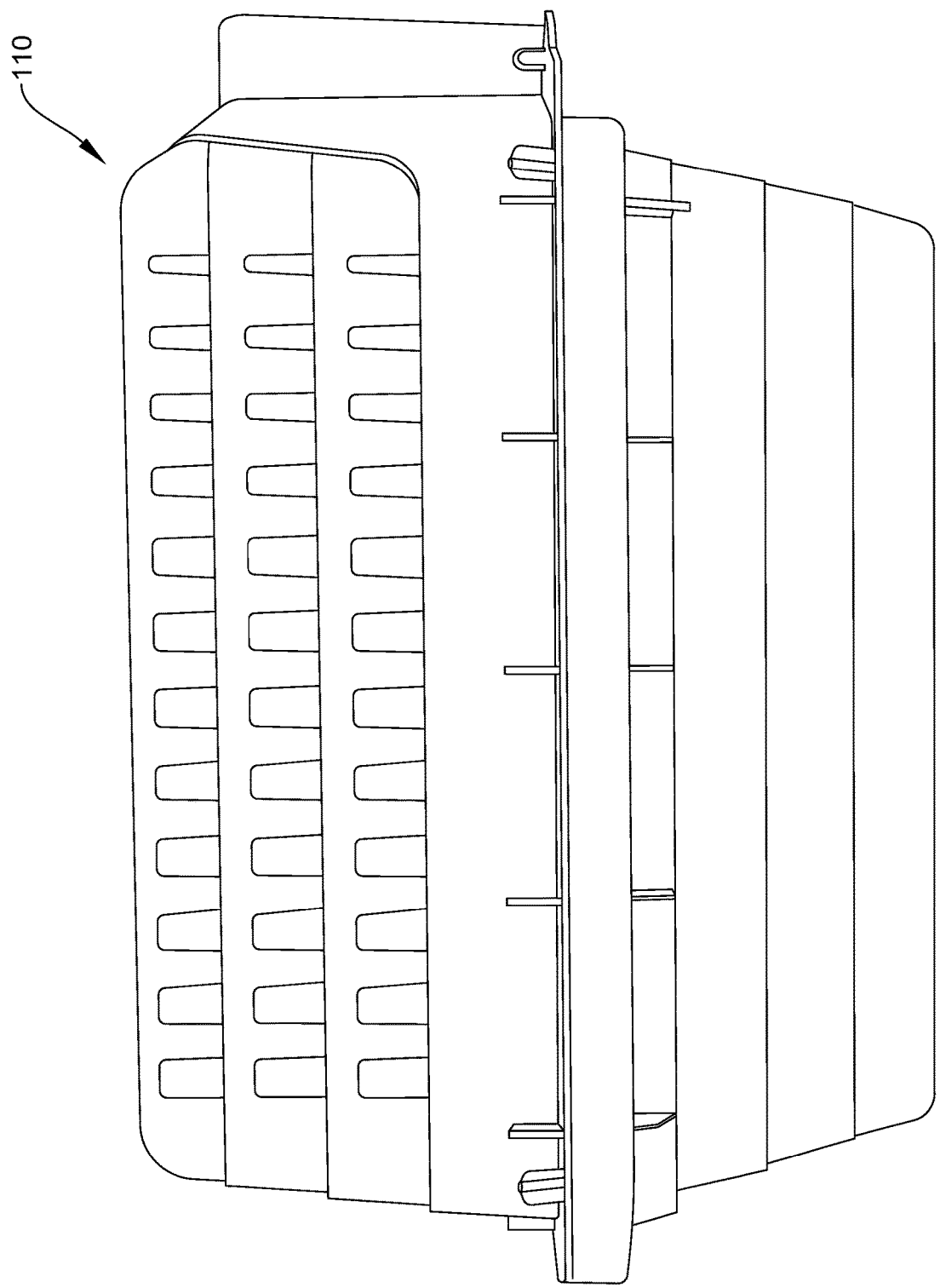
FIG. 20 is the side view of FIG. 18, but shown after the upper housing portion and lower housing portion have been fastened together using a plurality of bolts and wing nuts.
Figure 21:
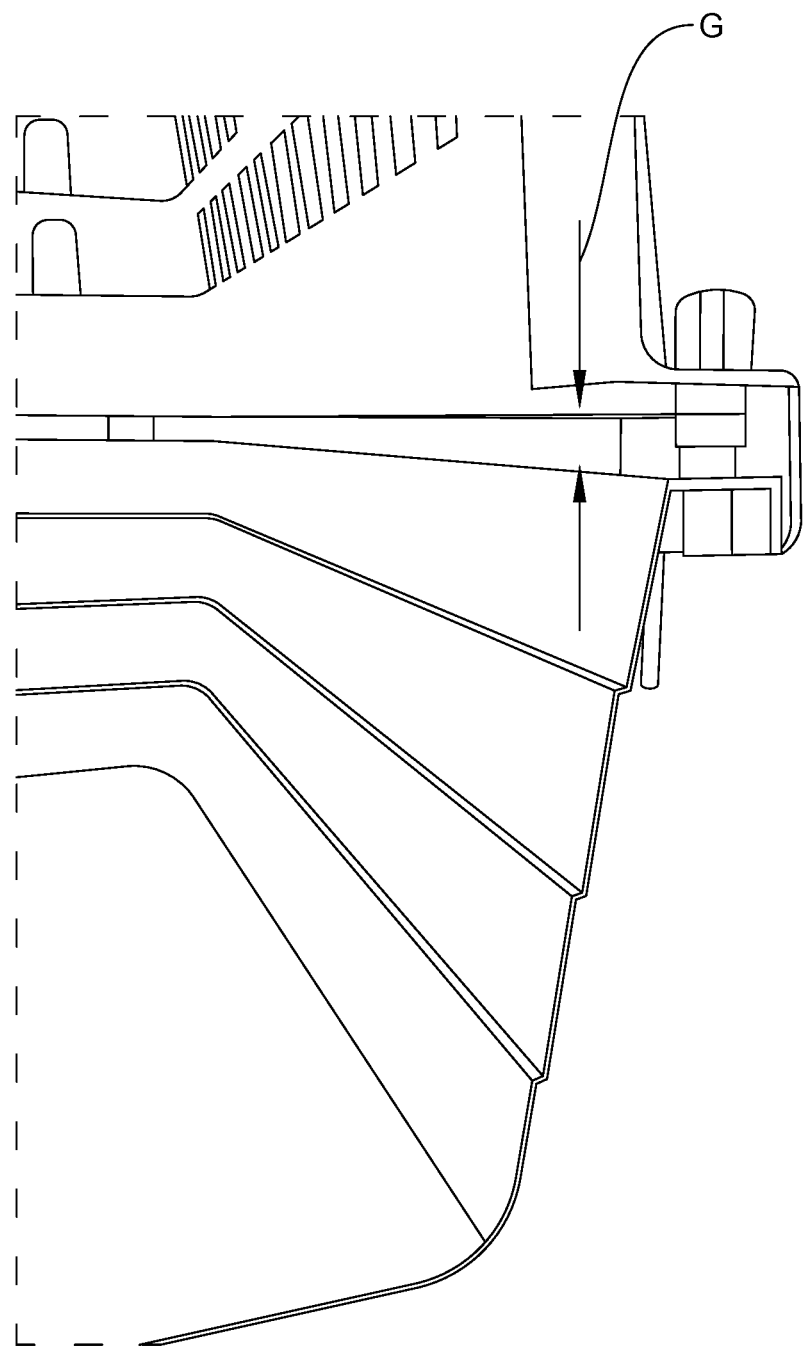
FIG. 21 is a perspective view of the front of the fastened upper housing portion and lower housing portion, as shown in FIG. 20.
Figure 24:
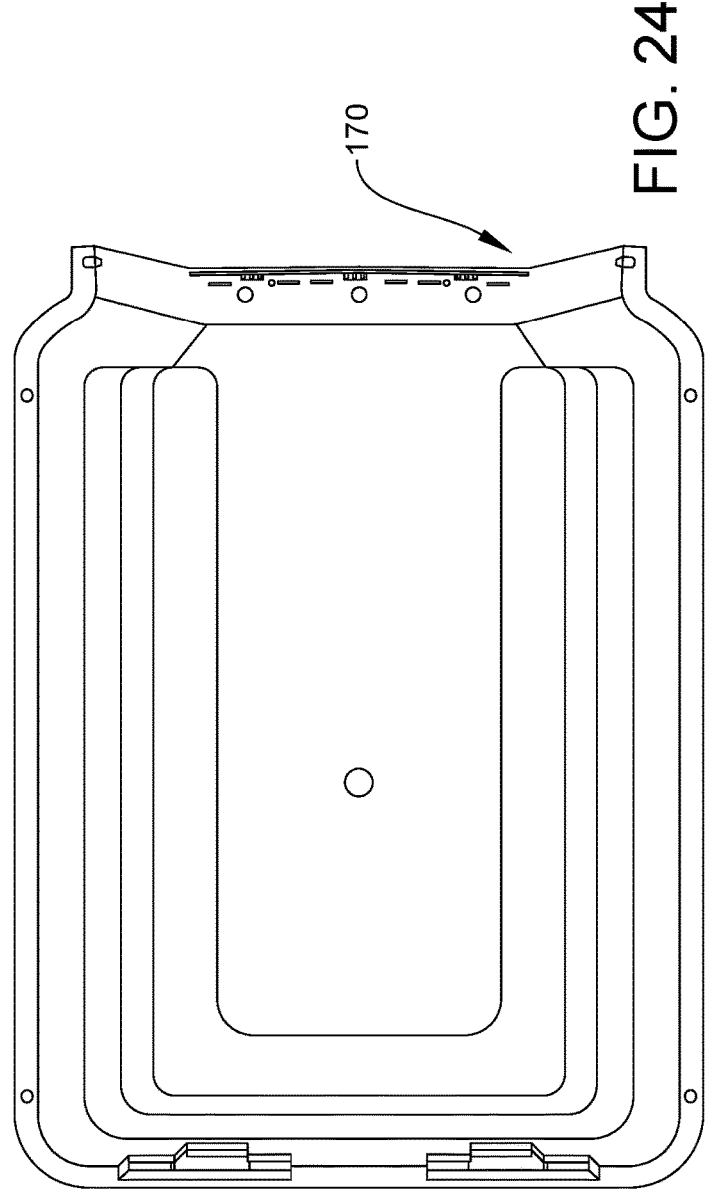
FIG. 24 is a top view of the base of the insert assembly of FIG. 22.
Figure 23:
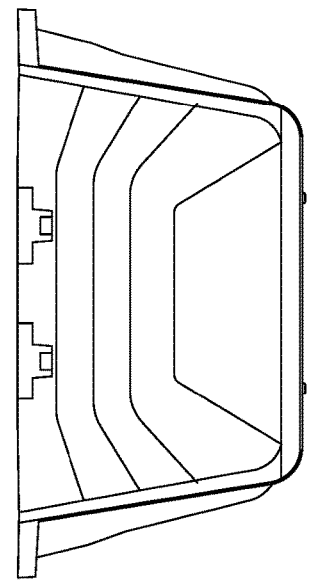
FIG. 23 is a front view of the base of the insert assembly of FIG. 22.
Figure 22:
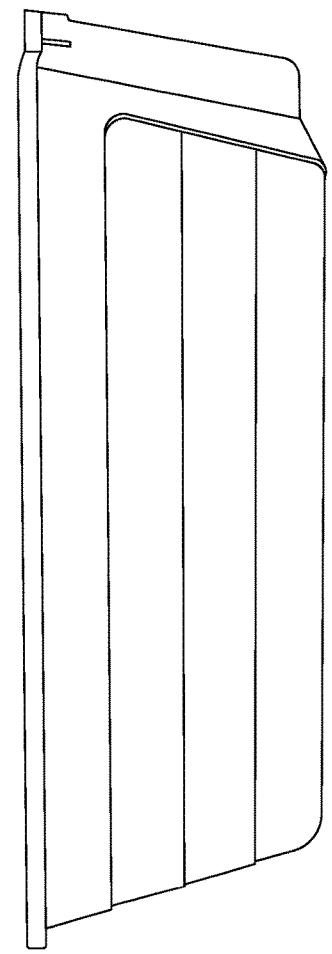
FIG. 22 is a side view of the base of the insert assembly of FIG. 3.

FIG. 19 is a bottom perspective view of the front of the upper housing portion 120 and lower housing portion 130 engaged with respect to each other, as shown in FIG. 18, and shown with a bolt 111 with a hex head just prior to being inserted into a hexagonal shaped opening in the mating flange of the lower housing portion, which hexagon shaped opening terminates on a hole that is aligned with a corresponding hole in the upper housing, for the bolt to fasten the housing portions together using the wing nut 112. Since the hexagonal shaped opening of the lower housing portion 130 prevents the hex head of the bolt 111 from rotating, the wing nut 112 may be tightened by hand to secure the housing portions together, as shown in FIG. 20. As seen in FIG. 21, a gap G between a flat surface of the mating flange 134 of the lower housing 130 and a flat surface of the mating flange 124 of the upper housing 120 may form a track to receive a flange of the base 170 of the insert assembly 160.

The insert assembly 160 shown in FIG. 3 may be formed of a base 170, a rear barrier wall 180, and a grate assembly 190.

The base 170 is shown in detail in FIGS. 22-26B, and may similarly be formed to have a four-sided rectangular box shape, being open on a first side (see FIG. 23) to subsequently accommodate joining of a portion of the grate assembly 190 thereto, and having a flange 173 surrounding a portion of a second open side (see FIG. 24) for sliding of the flange 173 within the gap G of the track between the flanges of the housing assembly 110 (see FIG. 21).

For ease of manufacturing, the rear end of the base 170 does not have a tall barrier wall integrally formed therewith, and instead uses a separate rear barrier wall 180 that is joined thereto. The barrier wall is intended to reach upward to terminate proximate to the interior upper surface of the upper housing portion 120, to prevent the cat from avoiding being drawn out of the carrier by jumping backward out of the base into the rear of the housing assembly.

Figure 28:
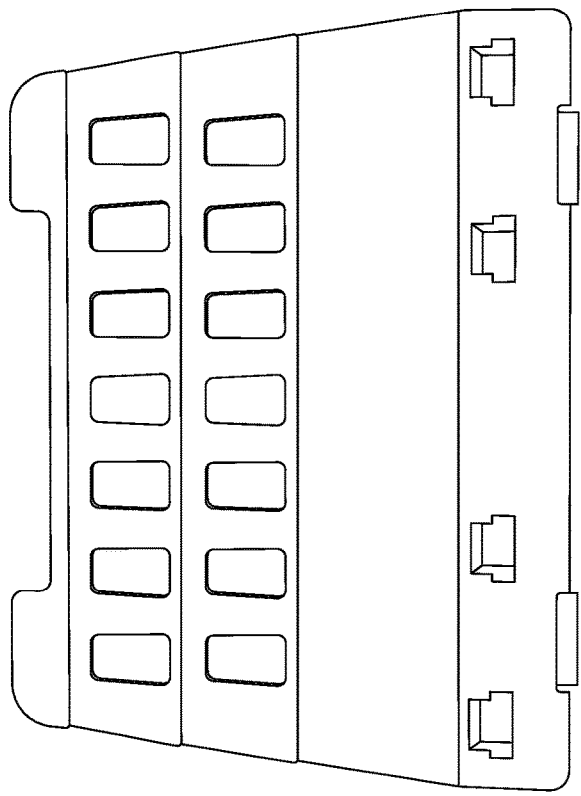
FIG. 28 is a rear view of the rear barrier panel of FIG. 27.
Figure 27:
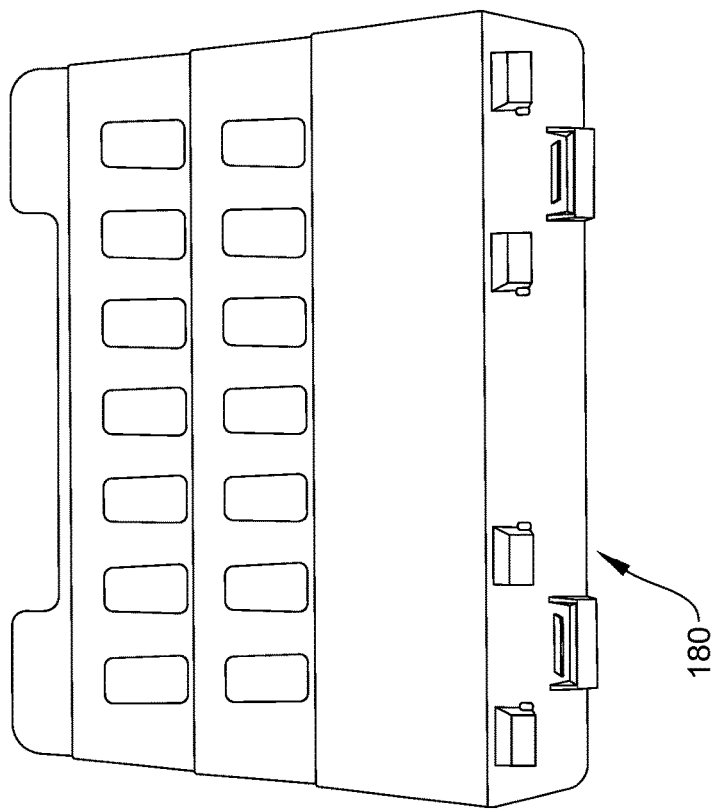
FIG. 27 is a front view of the rear barrier panel that is securable to the base of the insert assembly.

For ease of installing the separate rear barrier wall 180 by a pet owner without the use of tools, the base 170 may have at least one particularly formed joining structure 171 (see FIG. 23A), which may mate with a corresponding joining structure 181 (see FIG. 27B) on the rear barrier wall, as shown in FIGS. 27-28.

The joining structure 171 on the base 170 may include a stepped recess 172 (see FIG. 24A), an opening 173 (see FIG. 23A), and a protruding flange 174. As seen in FIG. 23A, the opening 173 may be T-shaped. Also, as seen in FIG. 23A, the protruding flange 174 may have a triangular-shaped cross-section for reasons discussed hereinafter.

Figure 28A:
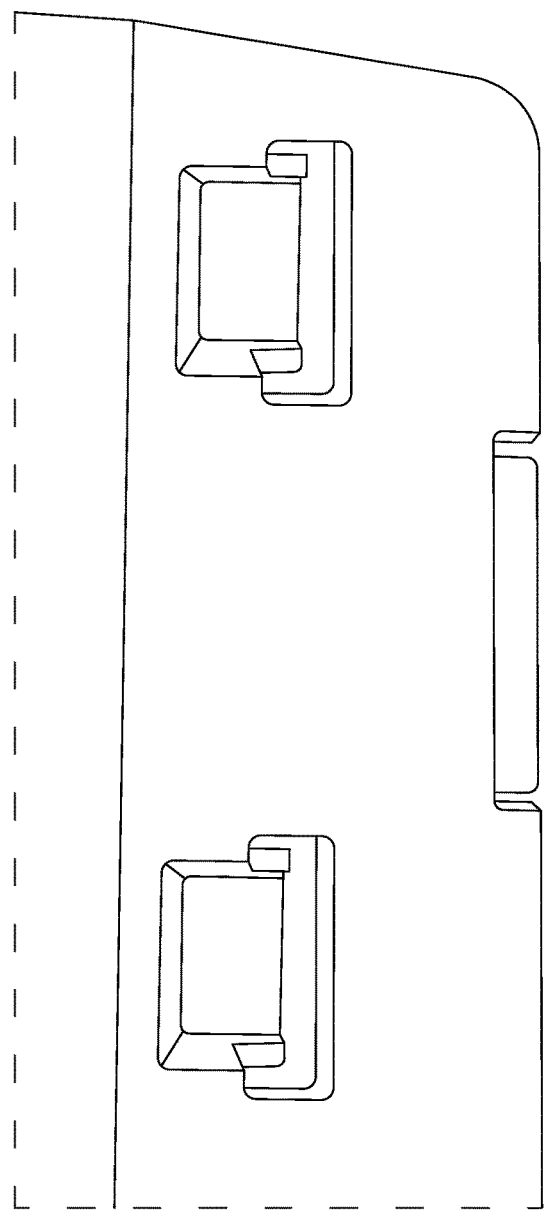
FIG. 28A is a corner of the rear side of the rear barrier panel of FIG. 28 shown enlarged.
Figure 28B:
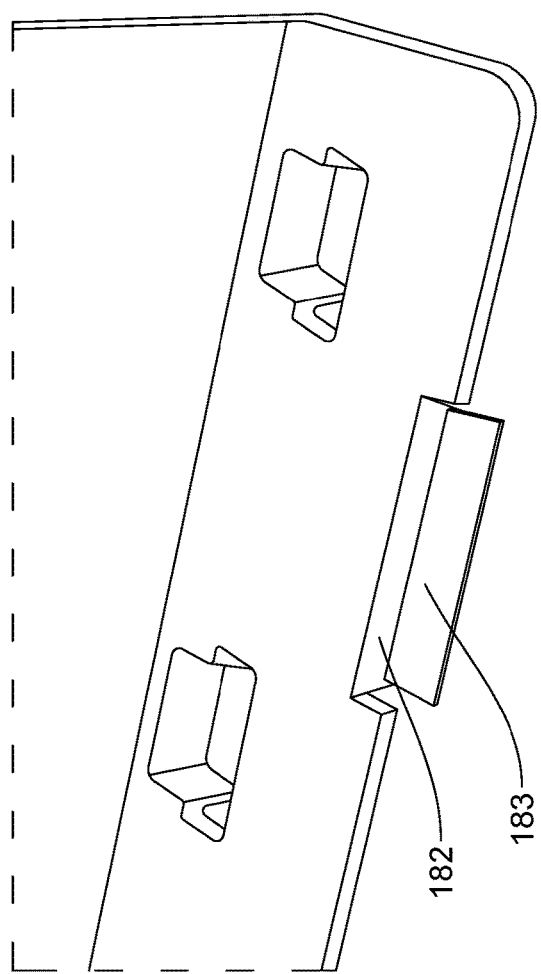
FIG. 28B is a perspective view of the corner of the rear of the rear barrier panel of FIG. 28A.

The corresponding joining structure 181 on the rear barrier wall 180 may include an L-shaped protrusion, having an outstanding leg 182 (see FIG. 28B) that may be generally perpendicular to the body of the rear barrier wall, and a down standing leg 183 that may be generally parallel to the body of the rear barrier wall. The joining structure 181 may also have a second protrusion with an outstanding leg 184 (see FIG. 27B) that may be generally perpendicular to the body of the rear barrier wall, and is positioned a distance away from the outstanding leg 182 to form a small gap therebetween. The distal ends of each of the outstanding legs 182 and 184 may be supported with respective triangular shaped stiffeners 181S/184S, to prevent flexure that may permit unintentional removal of the rear barrier wall 180 from the base 170.

Figure 29:
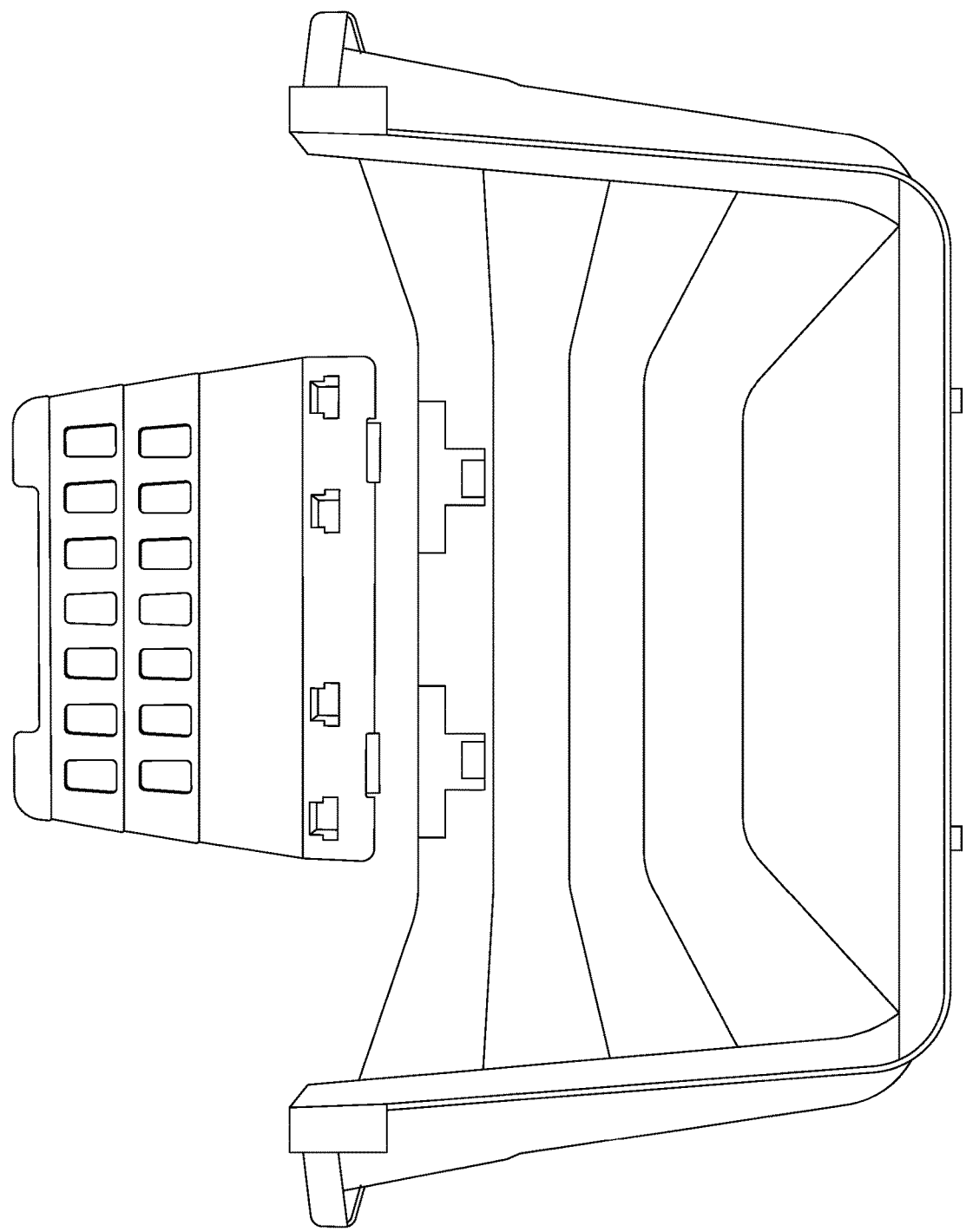
FIG. 29 is the front view of the base of the insert assembly as seen in FIG. 23, with the rear barrier panel also shown therein, and just prior to being coupled to the base.
Figure 31:
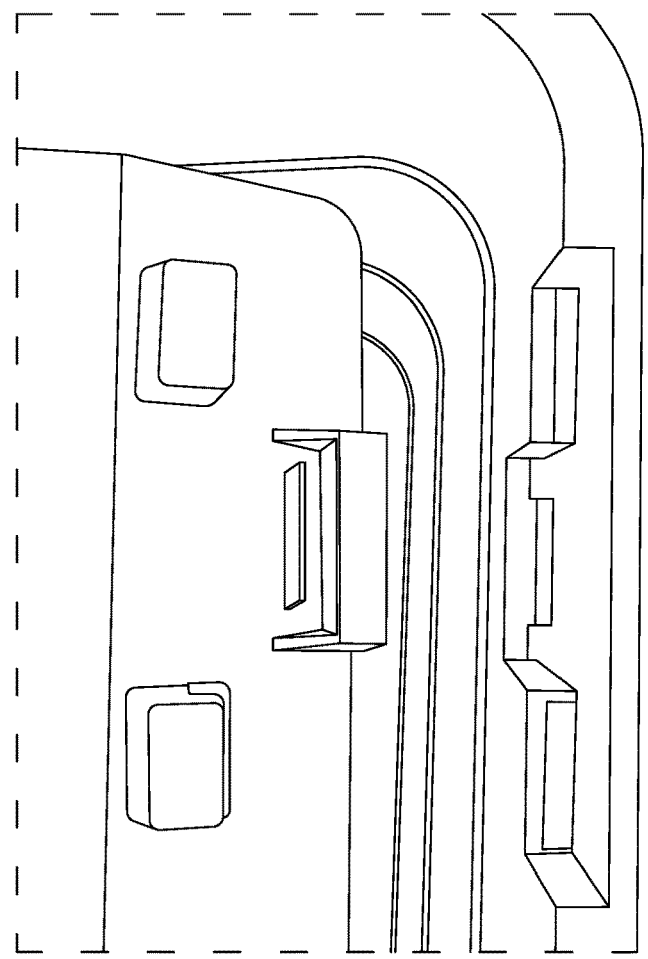
FIG. 31 is the top of the base of the insert assembly, as seen in FIG. 24, but showing the corresponding corner of the barrier wall just prior to being coupled to the base.
Figure 30:
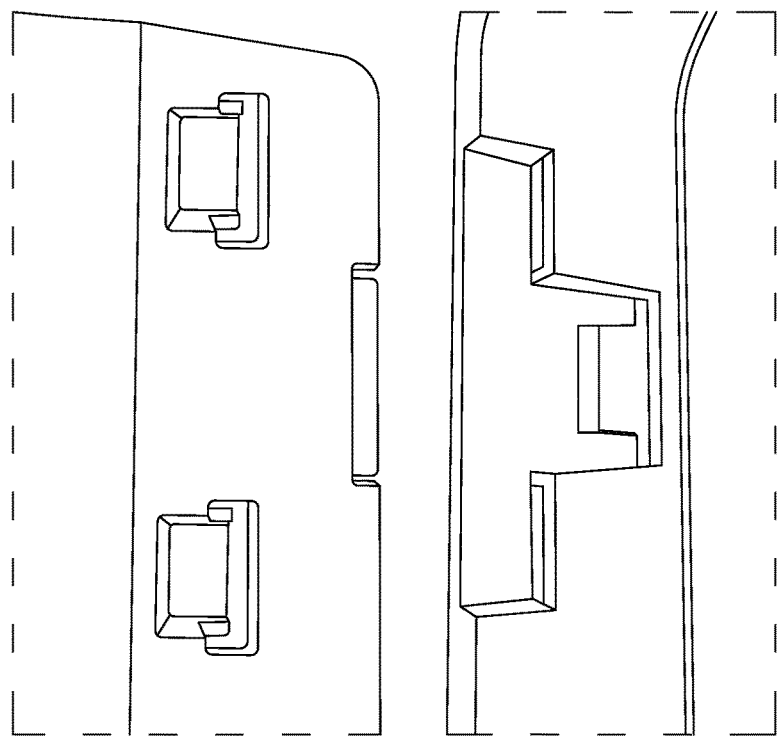
FIG. 30 is the front view of FIG. 30 showing one corner of the base and the barrier wall enlarged.
Figure 32:
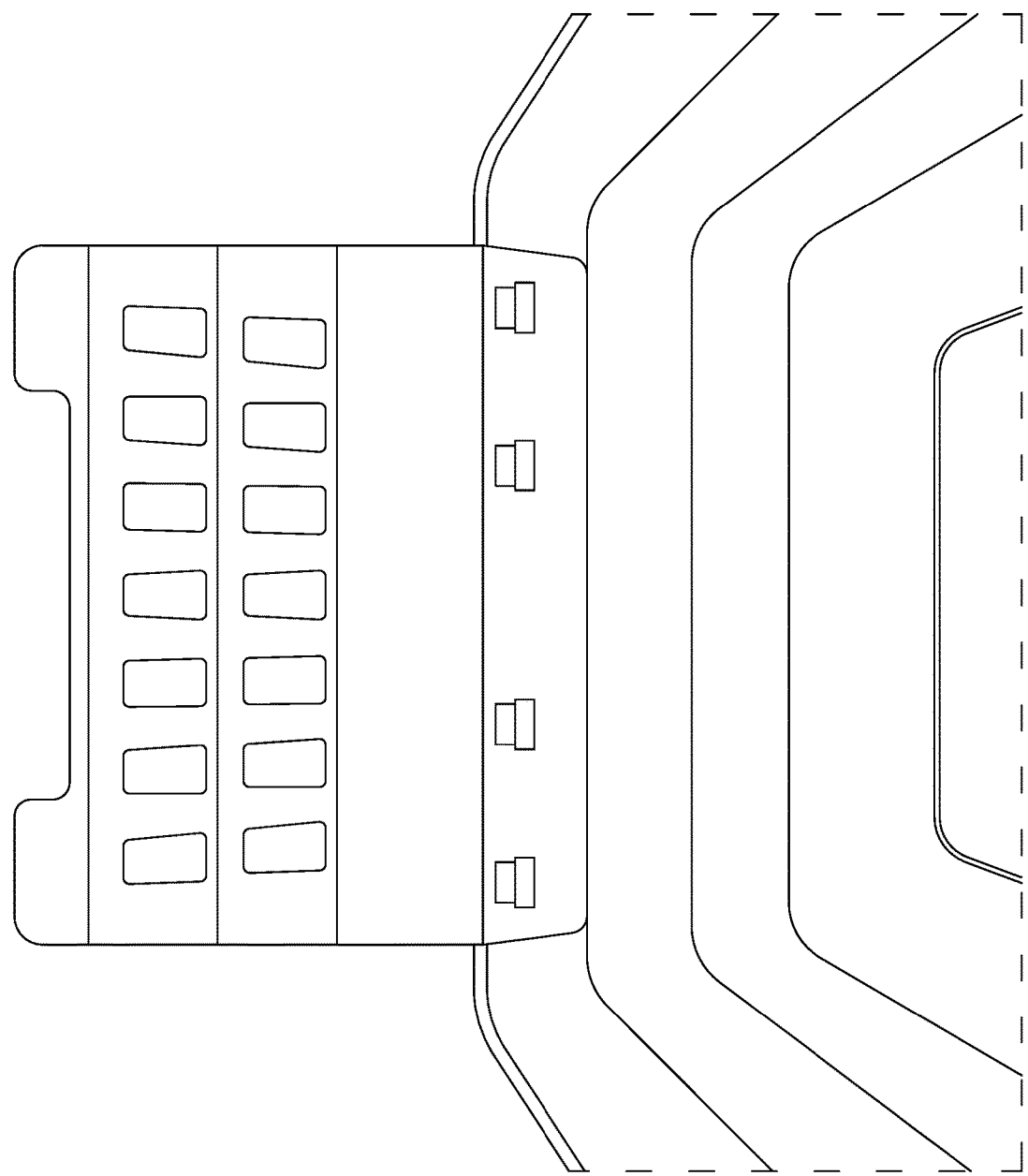
FIG. 32 is the front view of FIG. 29, but shown just after the rear barrier wall has been coupled to the base of the insert assembly.
Figure 33A:
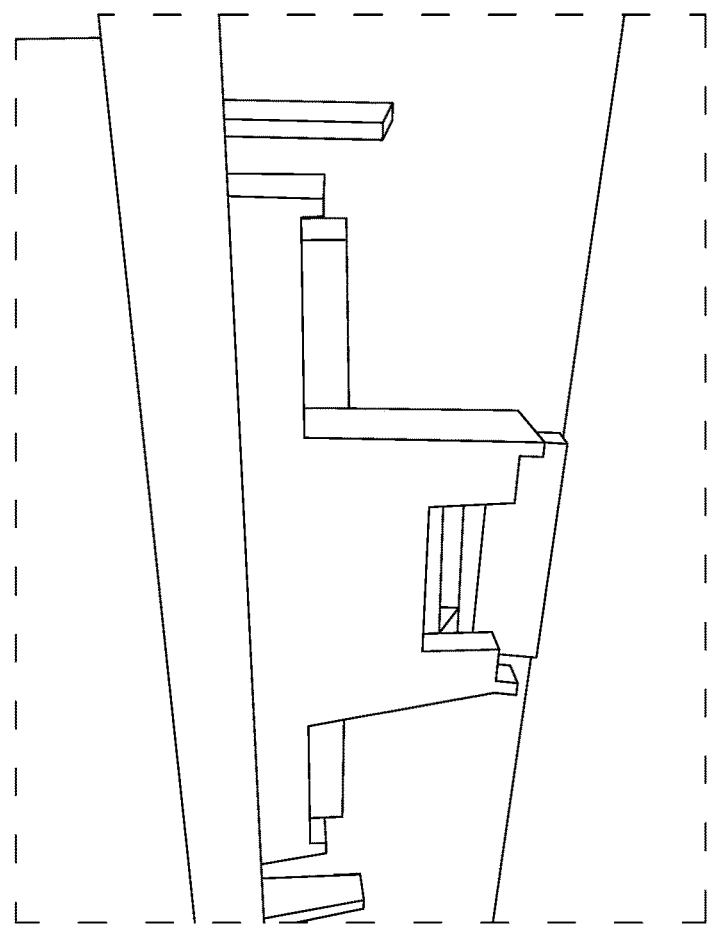
FIG. 33A is an enlarged perspective view of the coupled rear barrier wall and base of FIG. 32.
Figure 33:
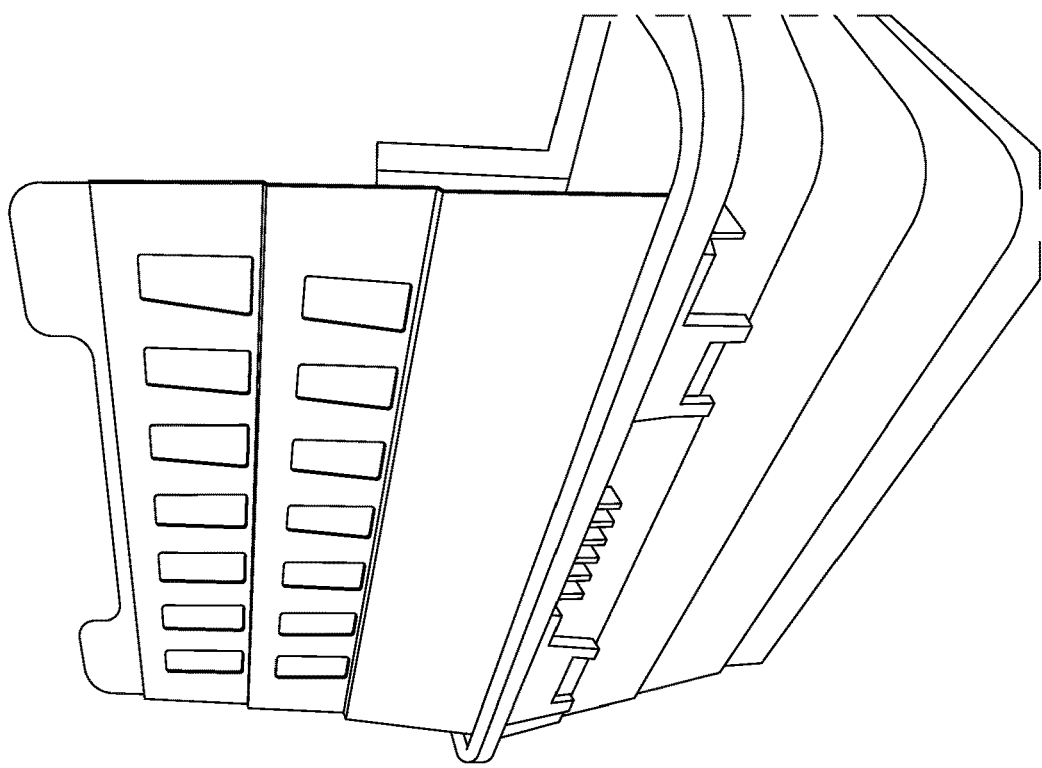
FIG. 33 is a rear perspective view of the coupled rear barrier wall and base of FIG. 32.

As may be seen in FIGS. 29, 30, and 31, the rear barrier wall 180 may be positioned so that its joining structure 181 may be advanced toward the joining structure 171 on the base 170. The outstanding leg 182 on the rear barrier wall 180 may be aligned with and subsequently received within the opening 173 of the joining structure of the base, by sliding past the angled upper surface of the triangular shaped protruding flange 174, which may cause some local deformation of the base 170. Once fully positioned within the opening 173, the flat lower surface of the protruding flange 174 may serve to prevent removal of the joining structure 181 of the rear barrier wall from the joining structure 171 on the base 170 through contact with the outstanding leg 184 (see FIGS. 32-33A).

For better locking of the rear barrier wall 180 to the base 170, two sets of joining structures 171 and 181 may be respectively used on the base 170 and rear barrier wall 180, as seen in FIG. 29. Additionally, for greater stability, the rear barrier wall may have a protruding flange 185 on each side of the locking structure 181 (see FIG. 27B), which may be slidably received in corresponding openings 175 in the base 170 (see FIG. 23B), and which may not lock therein.

FIGS. 34 and 35 are front and side views of the grate assembly 190 that may include a latch assembly, which are part of the insert assembly 160 shown in FIG. 3. The grate portion may have a peripheral wire 190P that may encircle the lattice of wires that may form the grate. The grate portion may also have: a first pair of wires 191*i* and 191*ii* that protrude past the peripheral wire in a first direction from a bottom thereof; a second pair of wires 192*i* and 192*ii* that protrude past the peripheral wire 190P laterally from a side of the grate, but then bend to terminate in a straight portion that is oriented in that first direction, and which may be used to couple the grate assembly to the lower housing portion 130. The grate portion may also have a wire 193 that extends beyond the top of the grate to form a straight section that is parallel to a portion of the peripheral wire 190P, and which may return to form another part of the interior of the grate.

Figure 26B:
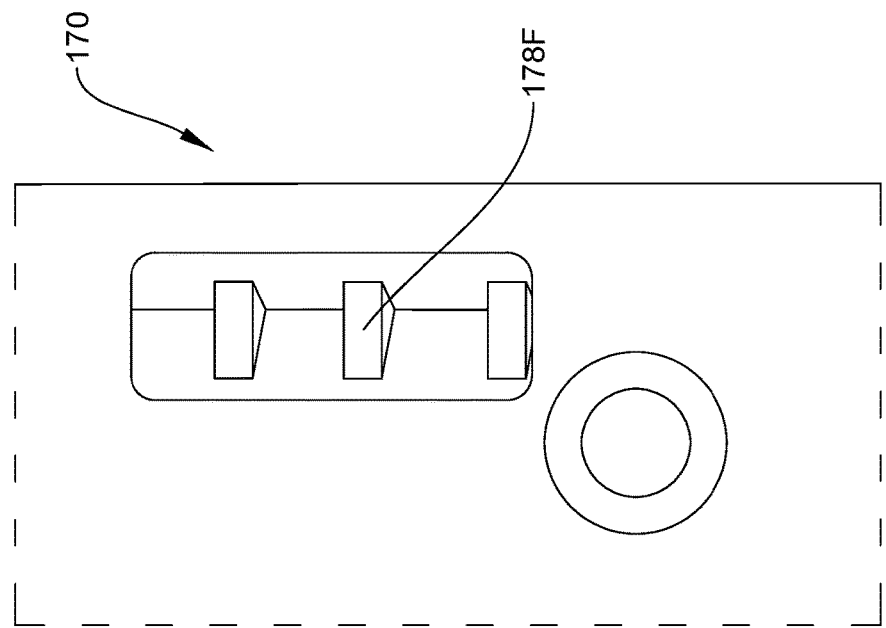
FIG. 26B is an enlarged detail view of the second corner of the base of the insert assembly shown in FIG. 26.
Figure 24B:
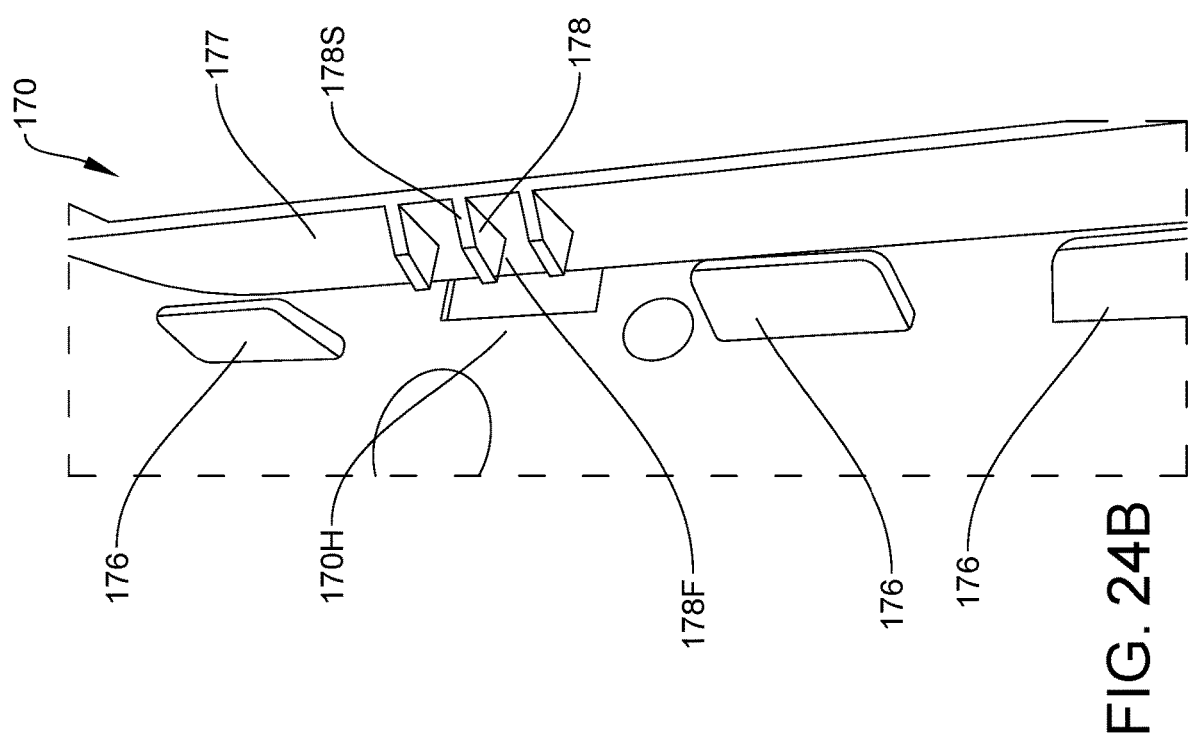
FIG. 24B is an enlarged detail view of a second corner of the base of the insert assembly shown in FIG. 24.
Figure 26:
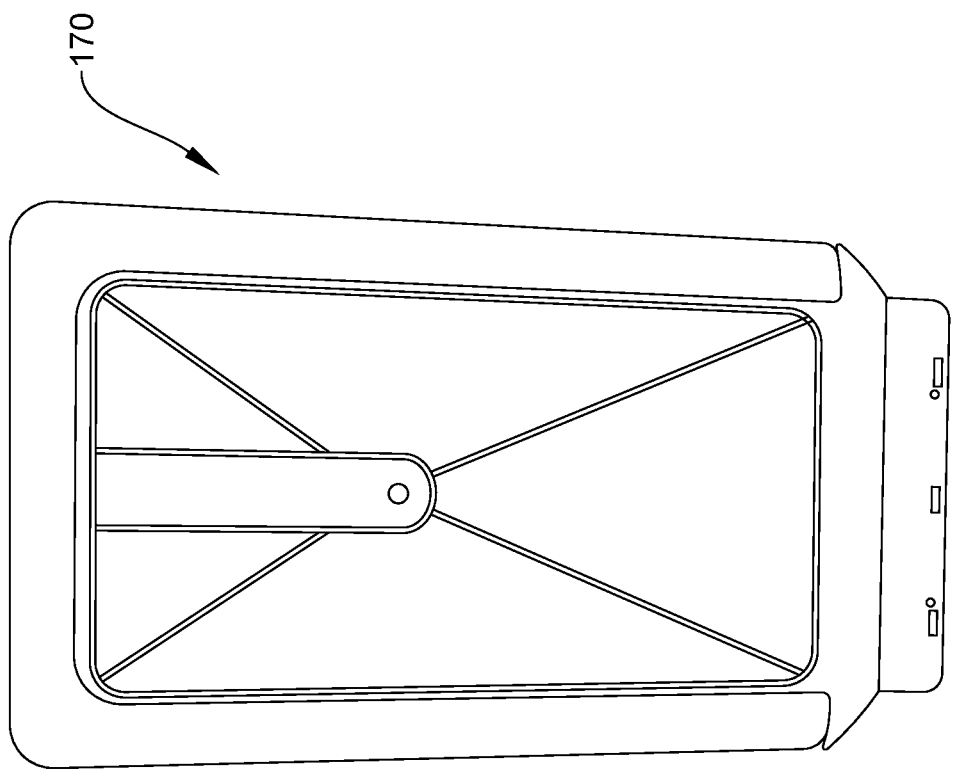
FIG. 26 is a bottom view of the insert assembly of FIG. 22.
Figure 25:
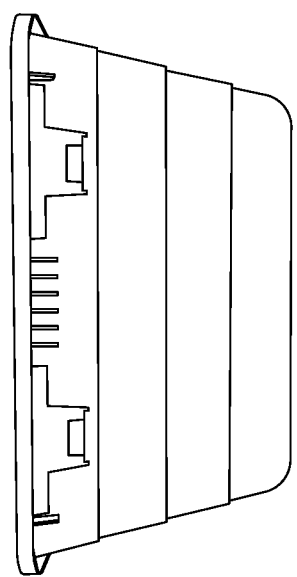
FIG. 25 is a rear view of the insert assembly of FIG. 22.
Figure 37:
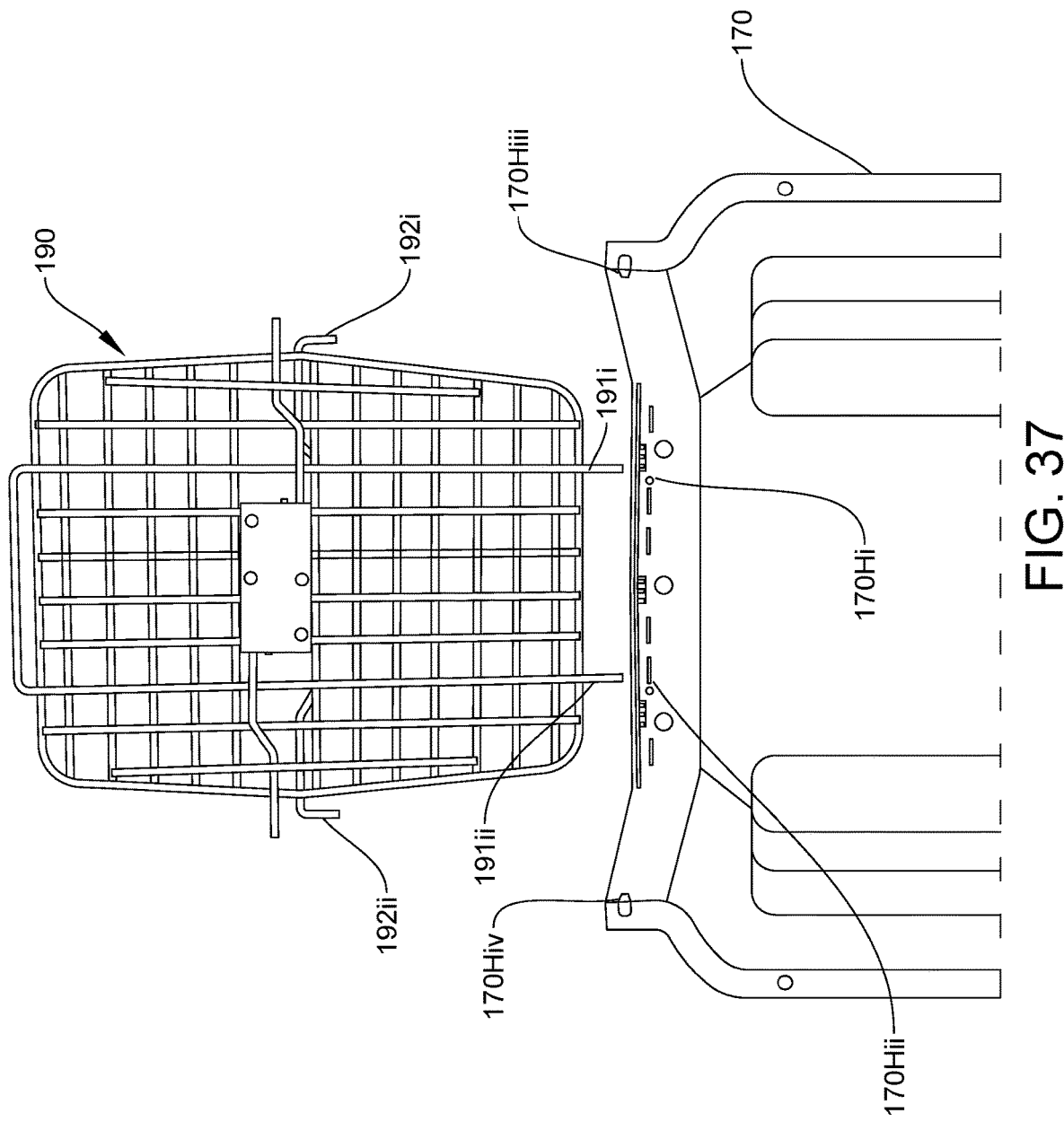
FIG. 37 is the top view of the base of the insert assembly as seen in FIG. 22, and showing the grate and latch assembly just prior to being coupled thereto.

As shown in FIG. 37, as well as in FIGS. 24B and 26B, the base 170 may have a first pair of holes 170Hi and 170Hii to receive the first pair of protruding wires 191*i* and 191*ii* of the grate, and a second pair of holes 170Hiii and 170Hiv, which may be recessed, to receive the ends of the second pair of wires 192*i* and 192*ii*, to align and slidably couple the grate with respect to the base. The base may also have one or more flat protrusions 176 that may be oriented parallel to the orientation of a front wall section 177 at the front bottom portion of the base, so that the bottom of the peripheral wire 190P of the grate may be nested therebetween, as the protruding wires 191*i*, 191*ii*, 192*i*, 192*ii* of the grate are received in the corresponding holes 170Hi, 170Hii, 170Hiii, and 170Hiv.

Figure 38:
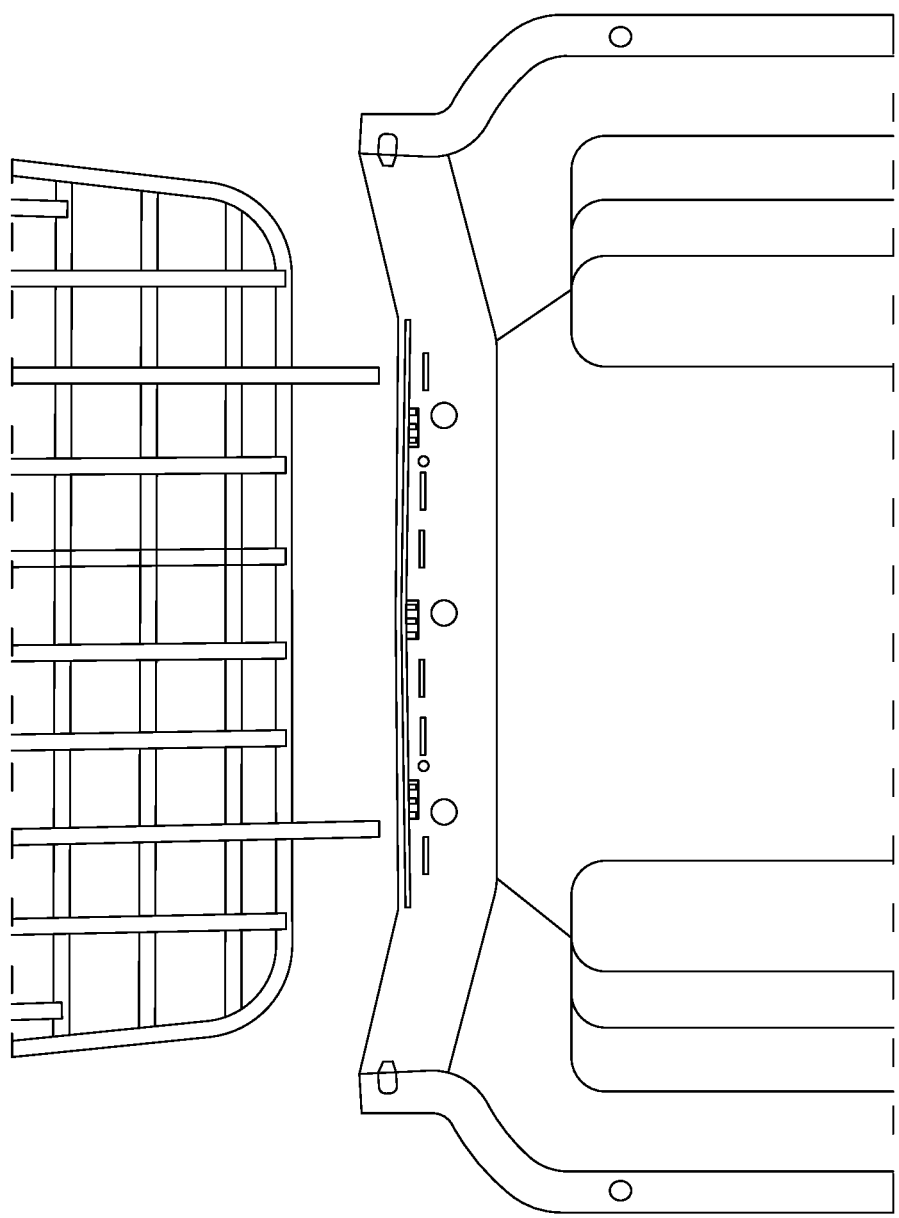
FIG. 38 shows the base of the insert assembly and the grate and latch assembly, as seen in FIG. 37, but shown enlarged and with the bottom of the grate being angled for coupling with the base.

To lock the grate with respect to the base 170, the base may also have a plurality of protrusions 178 protruding laterally towards the flat protrusion 176, and which may have a slanted upper surface 178S and a flat lower surface 178F. The slanted upper surface 178S permits pressure applied to the top of the grate to force its bottom peripheral wire 190P past the protrusions 178 by causing some local deformation (see FIG. 38A), until the peripheral wire is positioned between those protrusions and the bottom wall of the base, and is trapped there by the flat lower surface 178F (see FIG. 38B, and FIG. 39). A hole 170H may be positioned in the bottom of the base 170 near the set of protrusions 178 to better accommodate deformation.

Figure 36:
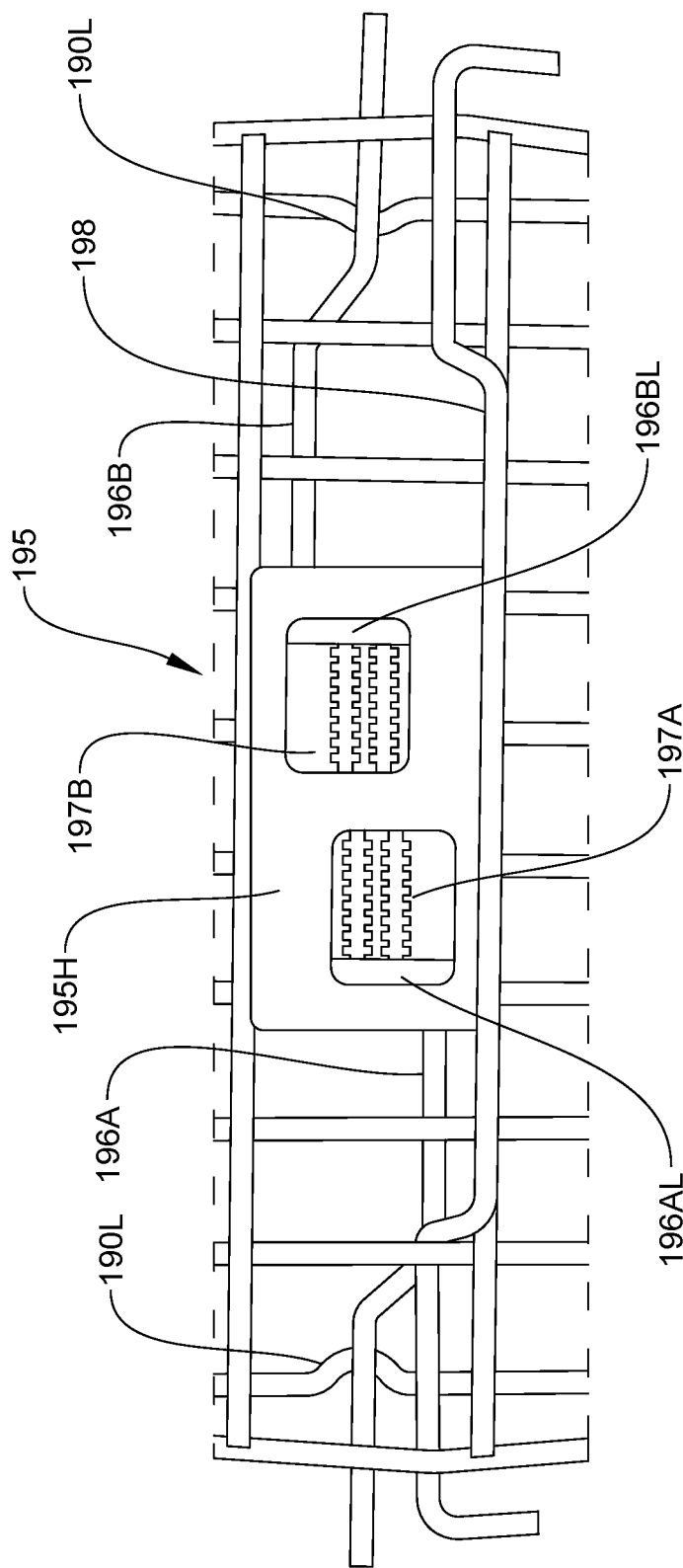
FIG. 36 is an enlarged detail view of the front side of the latch assembly of FIG. 34.
Figure 39:
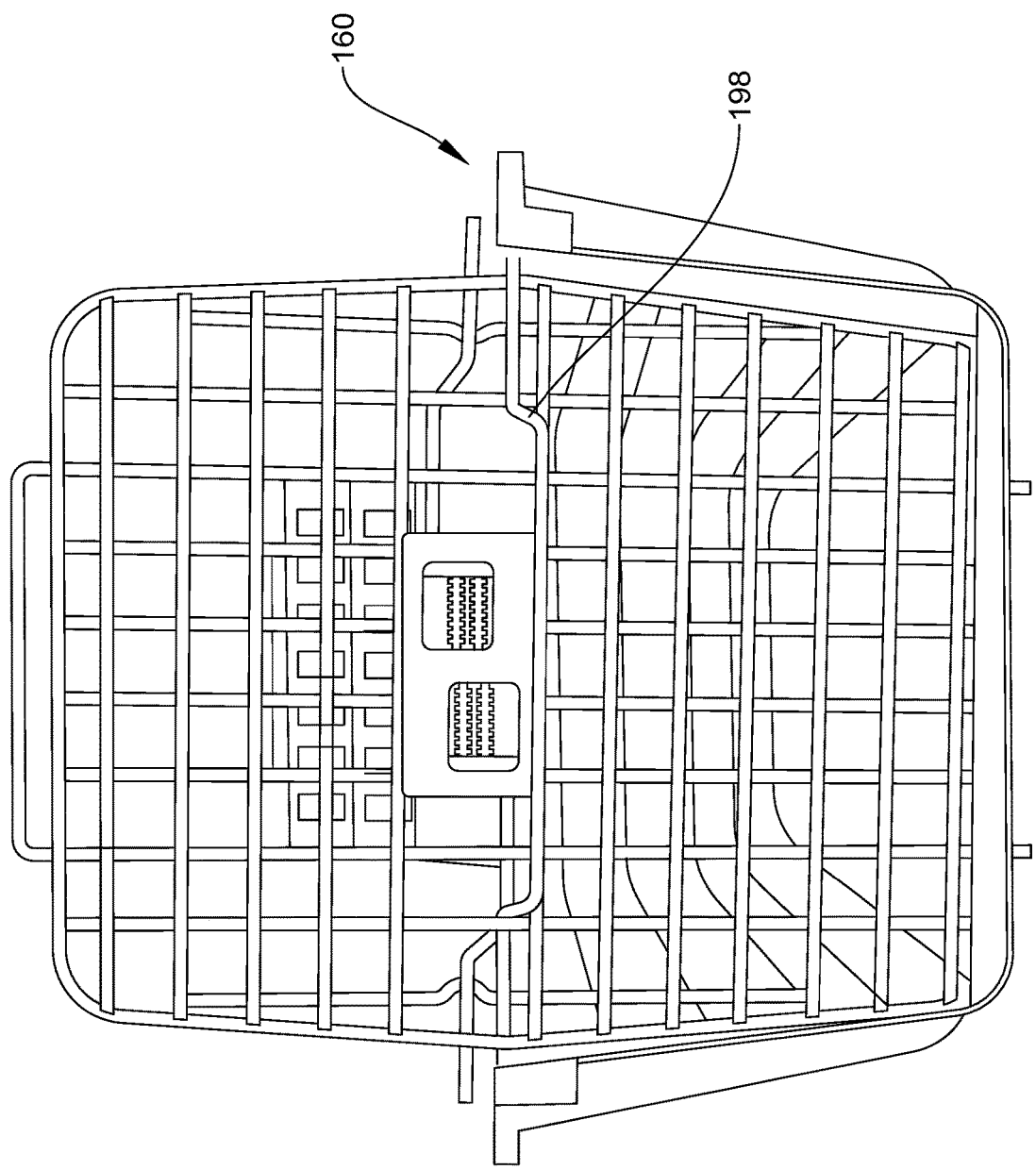
FIG. 39 is a front view of the assembled insert assembly shown in FIG. 3.
Figure 40:
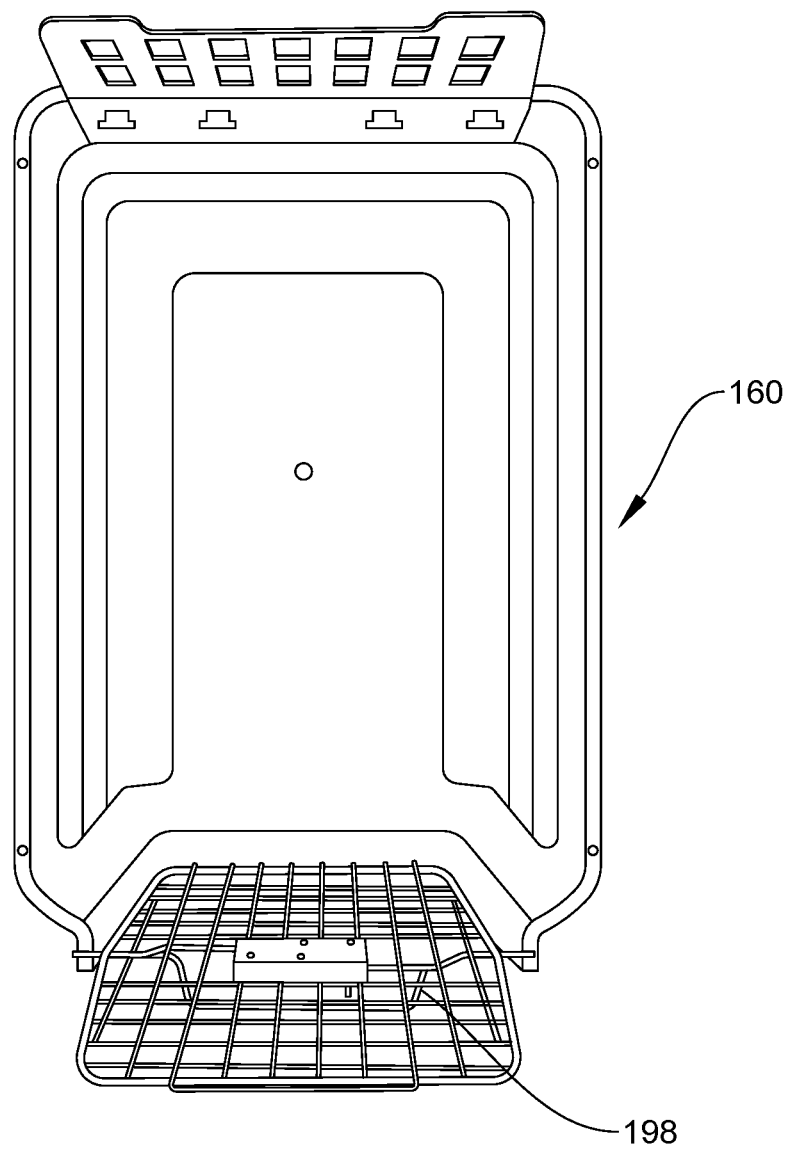
FIG. 40 is a top view of the assembled insert assembly shown in FIG. 3.

The latch assembly 195, as seen in FIG. 36, may have a housing 195H that houses and slidably supports a first end of a pair of latching wires 196*a* and 196*b*, which may be spring biased by respective springs 197A and 197B into the extended position shown in that figure. (Note that the latch wires may alternatively be supported directly by the lattice of the grate, using wire loops). The latching wires 196A and 196B may additionally be supported by loops 190L proximate to the distal ends of the wires. The latching wires 196A and 196B may each have a respective finger-sized loop 196AL and 196BL that may protrude beyond an opening in the latch housing 19511 (see FIGS. 35 and 36) which may be grasped by the pet owner to actuate the latch into an unlatched position (i.e., by opposing the spring biasing). The finger-sized loops 196AL and 196BL are preferably configured to be actuated by the thumb and forefinger of one hand of a user (e.g., while holding the cat in his/her other hand) when in the extended (latched) position, and thus are about 1.0 inches to 3.0 inches apart from each other, and more preferably may be about 1.5 inches to 2.5 inches apart, and most preferably may be about 1.75 inches to 2.25 inches apart. (Note that other distances or a range of other distances may be used in other embodiments). This dual simultaneous and directly opposite actuation is not feasible by a cat contained within the carrier 100, and therefore makes the latch cat-resistant. The loops 196AL and 196BL may also bear against one side of the opening in the housing to limit the outward biasing provide by the springs 197A and 197B. The grate assembly 190, as seen in FIGS. 36, 39, and 40, may also have a handle 198 that may be positioned in close proximity to the loops 196AL and 196BL. The handle 198, as seen at least in FIG. 36, may be positioned to extend horizontally to be just below the bottom-most finger-sized loops (i.e., loop 196AL), and may permit the thumb of the user to rest thereon while actuating the finger-sized loops 196AL, and while also permitting the user's middle finger, and/or, index finger, and/or pinky finger to grasp the handle 198 to pull the base 170 of the insert assembly 160 out of the housing assembly 110. The handle 198 may be positioned a small distance below the bottom of the finger-sized loop 196AL, being a distance between 0.0 inches and about 1.5 inches, or more preferably a distance being between .25 inches and 1.0 inches, and most preferably a distance being between .5 inches and .75 inches. (Note that in other embodiments, other distances or a range of other distances may be used).

Figure 41:
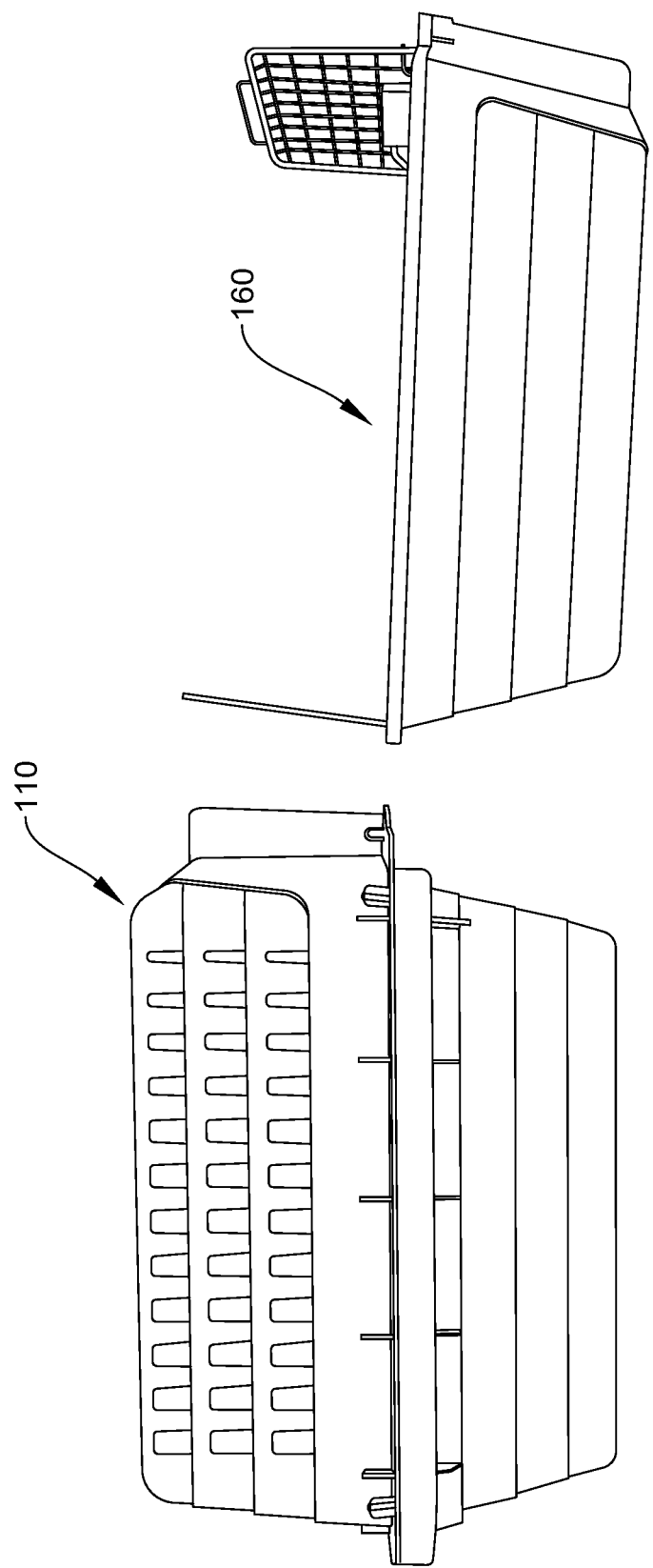
FIG. 41 is a side view of the housing and the insert assembly.
Figure 41C:
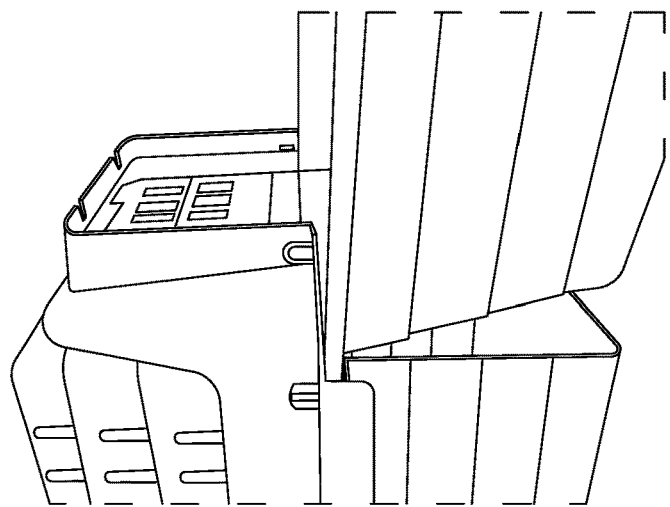
FIG. 41C is the perspective view of FIG. 41A, but shown after the rear end of the insert assembly has been inserted into the housing, but before sliding engagement of the base with the housing.
Figure 41B:
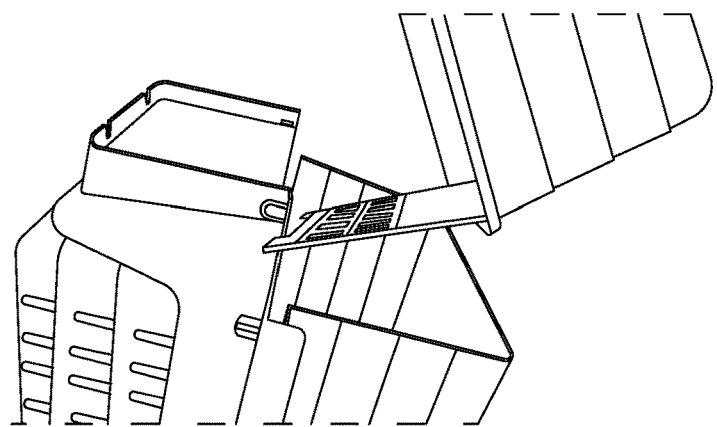
FIG. 41B is the perspective view of FIG. 41A, showing the insert assembly being angled and just prior to its rear end being inserted into the housing.
Figure 41A:
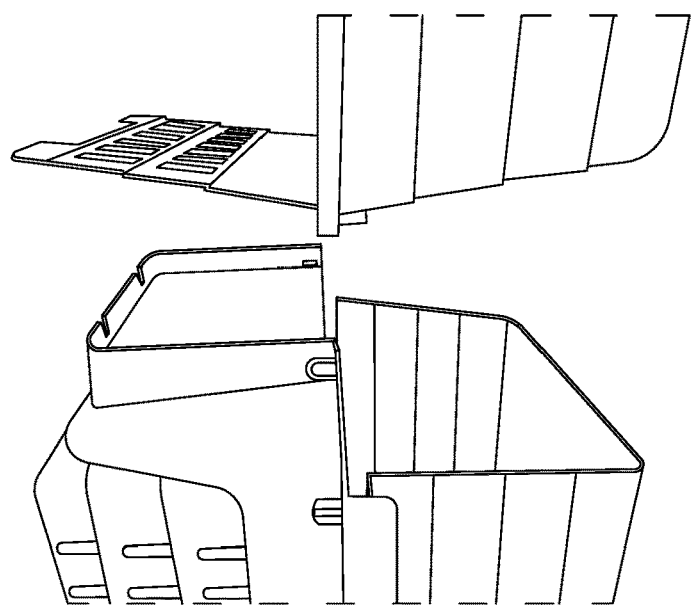
FIG. 41A is a perspective view of the rear end of the insert assembly positioned adjacent to the front end of the housing.
Figure 42:
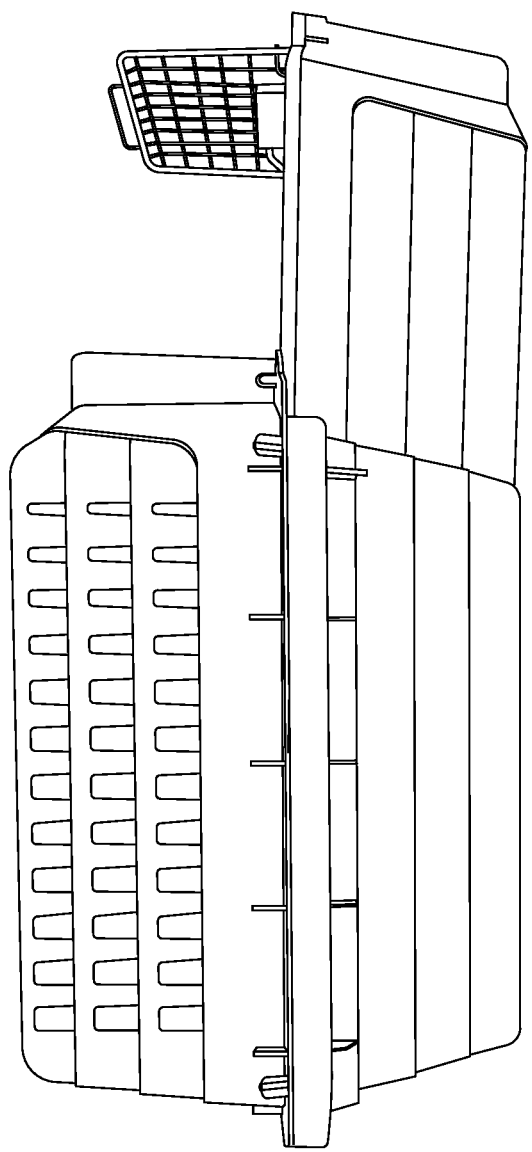
FIG. 42 is the side view of FIG. 41, but shown after the insert assembly is in sliding engagement with the housing.

As seen in FIGS. 41-41C, the rear barrier wall 180 of the slidable insert assembly 160 may first be positioned inside the housing assembly 110, and then the flange of the insert assembly may be positioned to slide in the track formed by the gap G of the housing assembly (FIG. 21), which sliding engagement may be seen in FIG. 42.

Figure 43A:
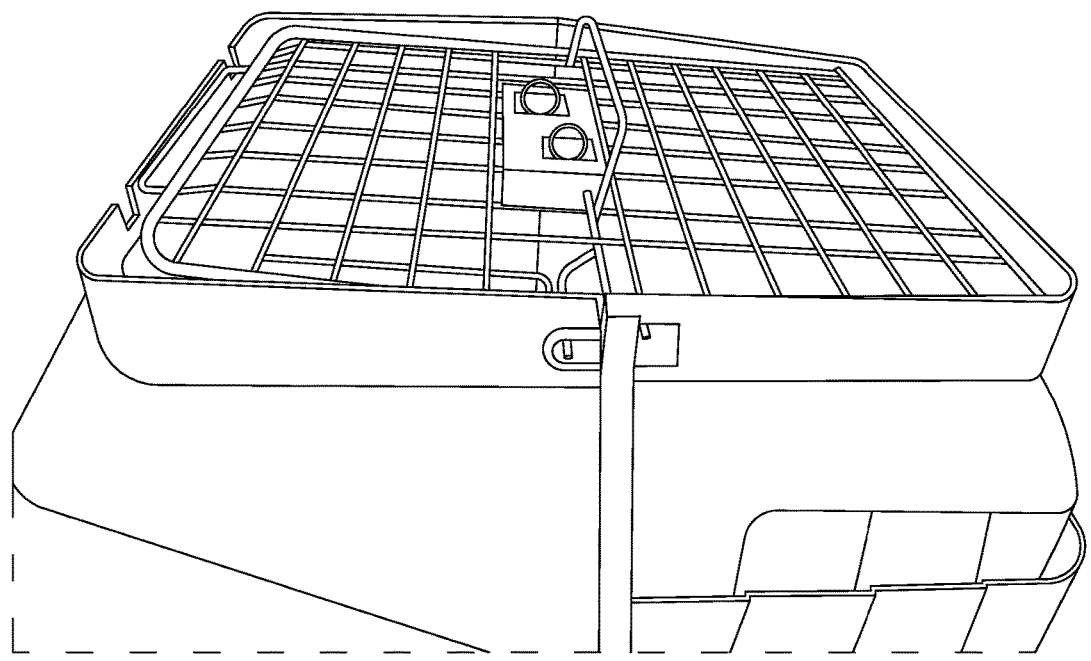
FIG. 43A is a front perspective view showing the latch wires of the latch assembly preventing the insert assembly from being fully received within the housing.
Figure 43B:
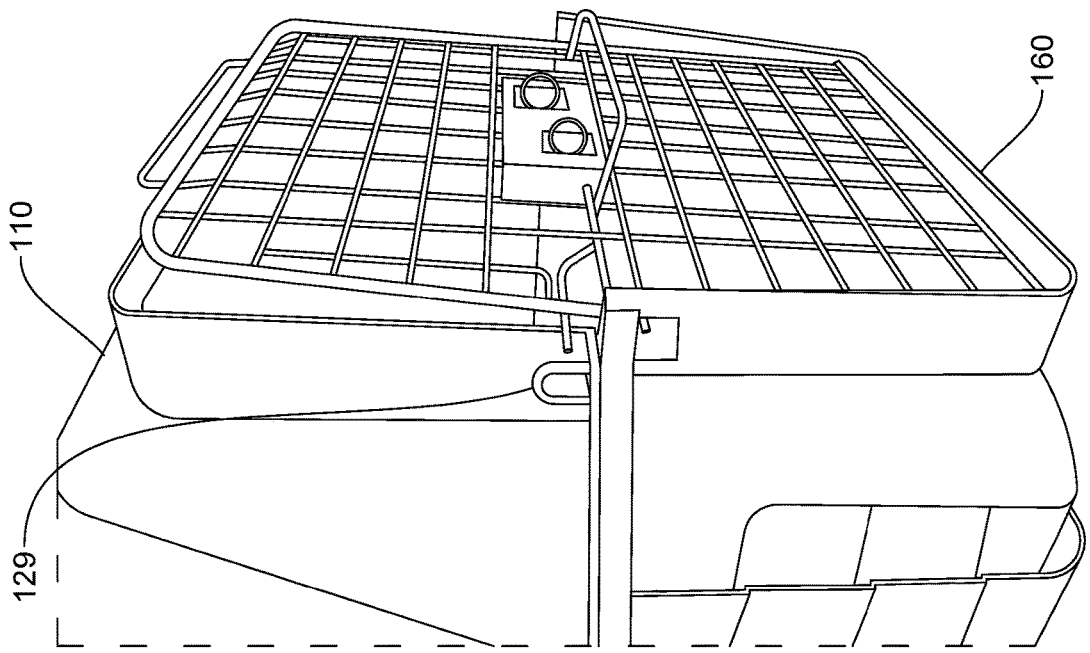
FIG. 43B is the front perspective view of FIG. 43A, but shown after the latch had been actuated to permit the insert assembly to be fully inserted into the housing, and after the latch was released to bias the latch wires into corresponding openings in the housing.

As the slidable insert assembly 160 is pushed further into the housing assembly 110, the distal ends of the latching wires 196A and 196B may contact the forward end of the upper housing portion 120, as seen in FIG. 43A. To secure and latch the slidable insert assembly 160 when fully within the housing assembly 110, the finger-sized loops 196AL and 196BL may be actuated by the pet owner to withdraw the distal ends of the latching wires 196A and 196B from the respective extended positions, so that the insert assembly may be pushed all the way into the housing assembly (see FIG. 43B). Once the pet owner releases the loops 196AL and 196BL, they are biased back into the extended positions, and are received within holes 129 in the upper housing portion (see FIG. 10 and FIG. 43A).

The handle 198 is in close proximity to, and ergonomically formed with respect to, the loops 196AL and 196BL so that when the per owner desires to open the carrier, even while holding the cat in a first hand, he/she may use a second hand to grasp the loops 196AL and 196BL and actuate them into the retracted position using a thumb and forefinger, while one or more of the other fingers on the same hand may wrap around the handle and simultaneously pull the insert assembly 160 outward.

Figure 44B:
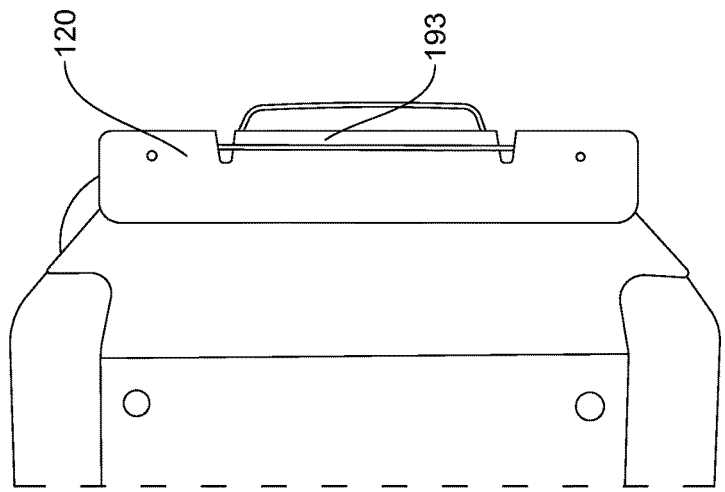
FIG. 44B is the top view of FIG. 44A, but shown after the latch had been actuated to permit the insert assembly to be fully inserted into the housing, and after the latch was released to bias the latch wires into corresponding openings in the housing, as seen in FIG. 43B.
Figure 44A:
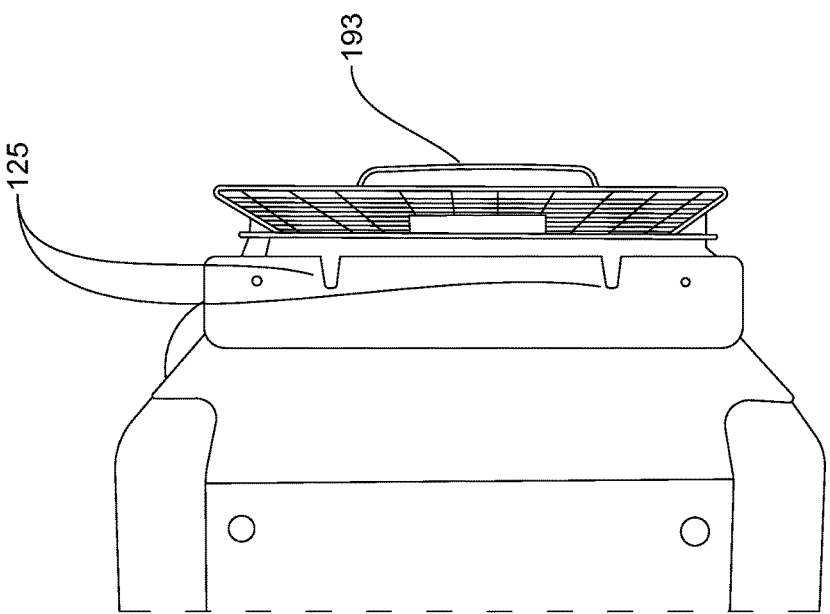
FIG. 44A is a top view showing the latch wires of the latch assembly preventing the insert assembly from being fully received within the housing, as seen in FIG. 43A.

As the insert assembly 160 is pushed into its final position within the housing assembly 110 (FIG. 43B), the left and right side portions of the wire 193 that extend beyond the top of the grate may be received within the pair of notches 125 positioned in the front upper surface of the upper housing portion 120 (see FIG. 44A and FIG. 44B). Also, the portion of the wire 193 that form a straight section that is parallel to the peripheral wire 190P, is subsequently position over the top of an upper surface of the entryway portion of the upper housing portion 120, and thereby prevents the cat from squeezing between the top of the grate and the top of the upper housing portion. This provides an added security precaution for maintaining the cat within the carrier.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

What is claimed is:

1. A cat carrier comprising:
   an enclosure, said enclosure comprising: a front opening defining an interior surface of a cavity; and a first hole and a second hole;
   a tray, at least a portion of said tray being slidably received through at least a portion of said front opening of said enclosure, and into said cavity of said enclosure, being movable between an extended position and a storage position;
   a grate, said grate joined to said tray; a first portion of said grate configured to extend away from said tray to obstruct an exposed portion of said front opening of said enclosure when said tray is in said storage position; and
   a latch; said latch comprising:
   a first latch wire; a first portion of said first latch wire slidably mounted with respect to said grate; a second portion of said first latch wire configured to extend at least to said periphery of said grate;
   a first spring, said first spring configured to bias said first latch wire;
   a second latch wire; a first portion of said second latch wire slidably mounted with respect to said grate; a second portion of said second latch wire configured to extend at least to said periphery of said grate; and
   a second spring, said second spring configured to bias said second latch wire; and
   wherein when said tray is in said storage position, said first and second springs respectively bias a distal end of said second portion of said first and second latch wires into said first and second holes, to redundantly latch said tray with respect to said enclosure; and
   wherein said grate comprises a handle wire formed into a rectangular-shaped handle; and
   wherein a center of said handle wire extends across, but is displaced from, said latch, being positioned to extend below said first and second latch wires, to permit pulling on said center of said handle wire using at least a middle finger to slide said tray out of said cavity, when said first and second latch wires are actuated using the thumb and forefinger, when said cat carrier is on a floor surface.

2. The cat carrier according to claim 1,
   wherein said first spring biases said first latch wire in a first direction into said first hole;

wherein said second spring biases said second latch wire in a second direction into said second hole; and wherein said second direction is opposite to said first direction, and requires simultaneous actuation of said first latch wire and said second latch wire in said opposite first and second directions to unlatch said tray with respect to said enclosure.

3. The cat carrier according to claim 2, wherein said first latch wire comprises a finger graspable loop configured to protrude from said grate in a direction being away from said cavity of said enclosure;

wherein said second latch wire comprises a finger graspable loop configured to protrude from said grate in said direction being away from said cavity of said enclosure; and wherein said finger graspable loop of said second latch wire is positioned proximate to, but spaced apart from, said finger graspable loop of said first latch wire, to permit respective grasping of first and second finger graspable loops using a thumb and forefinger to oppose said biasing to slide said first and second latch wires away from said first and second holes to unlatch said tray with respect to said enclosure.

4. The cat carrier according to claim 3, wherein said enclosure comprises first and second slots in proximity to said front opening, on an upper portion of said enclosure;

wherein said grate comprises a loop configured to extend beyond an upper portion of said periphery of said grate, said loop comprising first and second legs, and a connector leg configured to extend between said first and second legs; and wherein when said tray is in said storage position, said first and second legs are respectively received in said first and second slots of said enclosure, and said connector leg is positioned to overlie said upper portion of said enclosure, to prevent a cat from squeezing between said upper portion of said periphery of said grate and said upper portion of said enclosure.

5. The cat carrier according to claim 1, wherein said grate and said tray are configured for said grate being joined and locked with respect to said tray without the use of any tools.

6. The cat carrier according to claim 5, wherein said grate being joined and locked with respect to said tray without the use of any tools comprises:

a forward opening in said tray; and a forward facing flange formed around a periphery of said forward opening in said tray;

a first pair of holes respectively formed in a first upper portion and a second upper portion of said forward facing flange;

a second pair of holes respectively fanned in a first lower portion and a second lower portion of said forward facing flange;

a first pair of wires configured to protrude from said grate, and being respectively received in said first pair of holes when said grate is joined to said tray;

a second pair of wires configured to protrude from said grate, and being respectively received in said second pair of holes when said grate is joined to said tray;

at least one shaped protrusion configured to protrude up from said tray, said at least one shaped protrusion comprising: slanted upper surface and a flat lower surface;

wherein said slanted upper surface permits pressure applied to a top of said grate to force a bottom peripheral wire of said grate to contact and slide around said at least one shaped protrusion and cause local deformation of said tray, until said bottom peripheral wire is positioned between said forward facing flange and said flat lower surface of said at least one shaped protrusion, being retained thereat by said flat lower surface.

7. The cat carrier according to claim 6, further comprising:

at least one opening in said forward facing flange being positioned adjacent to said at least one shaped protrusion, to facilitate the local deformation of said tray.

8. The cat carrier according to claim 7, further comprising:

a rear barrier wall configured to prevent a cat from jumping backward out of said base into a rear of the enclosure, when said base is moved from said storage position to said extended position;

wherein said rear barrier wall is configured to join to a rear wall of said tray without the use of any tools.

9. The cat carrier according to claim 8, wherein said rear barrier wall being configured to join to a rear wall of said tray without the use of any tools comprises:

at least one joining structure on said tray; and a corresponding joining structure on said rear barrier wall;

wherein each said at least one joining structure on said tray comprises:

a stepped recess;

a central opening in said stepped recess; and a protruding flange, said protruding flange configured to protrude from said tray proximate to an upper end of said opening in said stepped recess;

wherein said corresponding joining structure on said rear barrier wall comprises:

a first protrusion, said first protrusion comprising: a down standing leg; and a second protrusion, said second protrusion comprising: an outstanding leg; and wherein when said corresponding joining structure on said rear barrier wall is advanced toward said joining structure on said tray, said down standing leg on said rear barrier wall is received within said central opening in said stepped recess of the tray, and said outstanding leg slides past a first side of said protruding flange, and is retained by a second side of said protruding flange to prevent removal of said joining structure of said rear barrier wall from said joining structure of said tray.

10. The cat carrier according to claim 9, wherein said down standing leg of said first protrusion is substantially parallel to a body of said rear barrier wall;

wherein said outstanding leg of said second protrusion is substantially perpendicular to said body of said rear barrier wall wherein said central opening in said stepped recess is a T-shaped opening.

11. The cat carrier according to claim 9, wherein said at least one joining structure on said tray further comprises: a first opening and a second opening in said stepped recess, being positioned on opposite sides of said central opening, and being positioned above said central opening; and wherein said corresponding joining structure on said rear barrier wall further comprises: a first flange and a second flange, said first flange and said second flange being slidably received in said first opening and said second opening in said stepped recess, respectively, to provide greater stability of said rear barrier wall when said rear barrier wall is joined to said tray.

12. The cat carrier according to claim 11, wherein said enclosure comprises:
a lower housing portion with an upper mating flange;
an upper housing portion with a lower mating flange;
wherein said lower mating flange of said upper housing portion is configured to releasably couple to said upper mating flange of said lower housing portion without the use of any tools.

13. The cat carrier according to claim 12, wherein said releasable coupling of said lower mating flange of said upper housing portion to said upper mating flange of said lower housing portion comprises:
a plurality of protrusions on one of said lower mating flange of said upper housing portion or on said upper mating flange of said lower housing portion;
a plurality of corresponding openings formed in the other of said lower mating flange of said upper housing portion or in said upper mating flange of said lower housing portion;
wherein each of said plurality of protrusions are configured to slidably engage in a respective one of said plurality of corresponding openings, when said upper housing portion is mated with said lower housing portion;
a plurality of holes in said lower mating flange of said upper housing portion;
a plurality of openings in said upper mating flange of said lower housing portion, being positioned to respectively align with said plurality of holes in said lower mating flange of said upper housing portion, each of said plurality of openings comprising: a cylindrical hole configured to transition into a hexagonal shaped opening;
a plurality of hex head bolts;
a plurality of wing nuts; and
wherein said plurality of hex head bolts are respectively received in said plurality of openings, with a hex head of said hex head bolt engaged within, and inhibited from rotation by, said hexagonal shaped opening, when one of said plurality of wing nuts is tightened thereon.

14. A cat carrier comprising:
an enclosure, said enclosure comprising: a front opening defining an interior surface of a cavity; a first hole; and a second hole;
a tray, at least a portion of said tray being slidably received through at least a portion of said front opening into said cavity of said enclosure, being movable between an extended position and a storage position;
a grate, said grate joined to said tray; a portion of said grate configured to extend away from said tray to obstruct an exposed portion of said front opening of said enclosure when said tray is in said storage position;
a latch, said latch comprising:
a first latch wire, said first latch wire being slidably mounted;
a first spring, said first spring configured to bias said first latch wire in a first direction;
a second latch wire, said second latch wire being slidably mounted;
a second spring, said second spring configured to bias said second latch wire in a second direction, said second direction being opposite to said first direction;
wherein when said tray is in said storage position, said first and second springs respectively bias a distal end of said first and second latch wires into said first and second holes, to redundantly latch said tray with respect to said enclosure;
wherein said first latch wire comprises a finger graspable loop;
wherein said second latch wire comprises a finger graspable loop; and
wherein said finger graspable loop of said second latch wire is positioned proximate to, but spaced apart from, said finger graspable loop of said first latch wire, to permit respective grasping of said first and second finger graspable loops using a thumb and forefinger, and requiring simultaneous actuation to oppose said biasing of said first spring and second spring to slide said first and second latch wires away from said first and second holes to unlatch said tray;
a handle wire comprising: a handle formed into a rectangular-shape; and
wherein a portion of said handle extends across, but is displaced from and positioned below said first and second finger graspable loops, to permit pulling on said handle using at least a middle finger, to slide said tray out of said cavity, when said first and second finger graspable loops are actuated using the thumb and forefinger.

* * * * *